United States Patent
Mahajan et al.

(10) Patent No.: US 11,733,987 B2
(45) Date of Patent: Aug. 22, 2023

(54) EXECUTING SHARED PIPELINES FOR CONTINUOUS DELIVERY OF SERVICES IN CLOUD PLATFORMS

(71) Applicant: salesforce.com, inc., San Francisco, CA (US)

(72) Inventors: Apoorv Mahajan, Foster City, CA (US); Jeaneth Aguilar Vergara, Granite Bay, CA (US)

(73) Assignee: Salesforce, Inc., San Francisco, CA (US)

( * ) Notice: Subject to any disclaimer, the term of this patent is extended or adjusted under 35 U.S.C. 154(b) by 68 days.

(21) Appl. No.: 17/491,915

(22) Filed: Oct. 1, 2021

(65) Prior Publication Data
US 2023/0108524 A1    Apr. 6, 2023

(51) Int. Cl.
| | |
|---|---|
| *H04L 41/08* | (2022.01) |
| *H04L 67/00* | (2022.01) |
| *G06F 9/445* | (2018.01) |
| *G06F 9/455* | (2018.01) |
| *G06F 8/71* | (2018.01) |
| *G06F 9/38* | (2018.01) |
| *G06F 8/60* | (2018.01) |
| *H04L 67/10* | (2022.01) |

(52) U.S. Cl.
CPC ............... *G06F 8/60* (2013.01); *H04L 67/10* (2013.01)

(58) Field of Classification Search
CPC . G06F 8/60; G06F 8/71; G06F 9/4881; G06F 9/3869; G06F 9/5072; G06F 8/70; G06F 21/105; G06F 8/34; H04L 67/10
See application file for complete search history.

(56) References Cited

U.S. PATENT DOCUMENTS

| | | |
|---|---|---|
| 9,419,856 B1 | 8/2016 | Chawla et al. |
| 10,318,285 B1 | 6/2019 | Jodoin et al. |
| 10,334,058 B2 | 6/2019 | Frank et al. |
| 11,093,227 B1 | 8/2021 | Shteyman et al. |
| 11,392,361 B2 * | 7/2022 | Kiselev ............... G06F 8/71 |

(Continued)

OTHER PUBLICATIONS

Liu et al., MV4MS: A Spring Cloud based Framework for the Co-Deployment of Multi-Version Microservices, 8 pages (Year: 2020).*

(Continued)

*Primary Examiner* — Thuy Dao
(74) *Attorney, Agent, or Firm* — Fenwick & West LLP

(57) ABSTRACT

A system deploys software artifacts in data centers created in a cloud platform using a cloud platform infrastructure language that is cloud platform independent. The system allows service owners to define shared pipelines that can be invoked by multiple parent pipelines. The system receives an artifact version map associating datacenter entities with services targeted for deployment on the datacenter entities. The artifact version map specifies attributes associated with invocations of the shared pipeline. The system generates deployment pipelines based on the artifact version map. The deployment pipelines allow a parent pipeline that invokes the shared pipeline to specify attributes including version of the shared pipeline, versions of software artifacts used by the shared pipeline, values of parameters used by the shared pipeline, or promotion criteria used by the shared pipeline.

20 Claims, 15 Drawing Sheets

(56) References Cited

U.S. PATENT DOCUMENTS

| | | | |
|---|---|---|---|
| 2012/0180024 | A1 | 7/2012 | Gonzalez et al. |
| 2017/0177324 | A1 | 6/2017 | Frank et al. |
| 2018/0048521 | A1 | 2/2018 | Nair et al. |
| 2018/0329738 | A1 | 11/2018 | Kasha et al. |
| 2018/0364985 | A1 | 12/2018 | Liu et al. |
| 2019/0129712 | A1 | 5/2019 | Hawrylo et al. |
| 2019/0138288 | A1 | 5/2019 | Brealey et al. |
| 2020/0117434 | A1 | 4/2020 | Biskup et al. |
| 2020/0125344 | A1 | 4/2020 | Varghese et al. |
| 2021/0055917 | A1* | 2/2021 | Khakare ............... G06F 3/0482 |
| 2021/0064355 | A1 | 3/2021 | Martinsson |
| 2021/0232388 | A1 | 7/2021 | Mirantes et al. |
| 2022/0091858 | A1* | 3/2022 | Chivukula .......... H04L 63/0272 |

OTHER PUBLICATIONS

Austel, P. et al., "Continuous Delivery of Composite Solutions: A Case for Collaborative Software Defined PaaS Environments," BigSystem '15, Jun. 2015, pp. 3-6.

Burns, E. et al., "Continuous Delivery with Spinnaker," May 11, 2018, XP055626768, pp. 1-81.

Burns, E., "Why Spinnaker matters to CI/CD," Aug. 27, 2019, seven pages, [Online] [Retrieved on Jan. 19, 2021] Retrieved from the Internet <URL: https://opensource.com/article/19/8/why-spinnakermatters-cicd>.

Mukherjee, J., "What is a continuous delivery pipeline?" Date Unknown, 14 pages, [Online] [Retrieved on Jan. 19, 2021] Retrieved from the Internet <URL: https://www.atlassian.com/continuousdelivery/pipeline>.

PCT International Search Report and Written Opinion, PCT Application No. PCT/US2021/015822, dated Jul. 15, 2021, 19 pages.

Thakur, V., "Continuous Delivery Pipeline for Kubernetes Using Spinnaker," May 27, 2020, 21 pages, [Online] [Retrieved on Jan. 19, 2021] Retrieved from the Internet <URL: https://www.metricfire.com/blog/continuous-delivery-pipeline-for-kubernetes-usingspinnaker/?GAID=undefined&GAID=undefined>.

United States Office Action, U.S. Appl. No. 17/112,974, dated Aug. 16, 2021, 30 pages.

* cited by examiner

700

710 Generating one or more datacenters based on a cloud platform independent declarative specification of a data center

720 Generating a cloud platform independent master deployment pipeline for different environment

730 Receiving customizations to logic for promotion of artifact from one stage to next

740 Compiling the deployment pipeline to generate detailed cloud platform specific deployment pipeline

750 Receiving code for releasing a feature on the target cloud platform

760 Executing the cloud platform specific deployment pipeline to deploy software artifacts using the generated pipeline

FIG. 7

EXECUTING SHARED PIPELINES FOR CONTINUOUS DELIVERY OF SERVICES IN CLOUD PLATFORMS

BACKGROUND

Field of Art

This disclosure relates in general to management of software releases in cloud computing platforms, and in particular to shared pipelines for continuous delivery of services in cloud computing platforms.

Description of the Related Art

Organizations are increasingly relying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. A large system such as a multi-tenant system may manage services for a large number of organizations representing tenants of the multi-tenant system and may interact with multiple cloud platforms. Such systems may have several teams developing software and deploying the software on cloud platforms.

Organizations maintain cloud infrastructure on cloud platforms using continuous delivery platforms that can manage and deploy applications on cloud platforms. Such continuous delivery platforms allow organizations to simplify software deployment processes and manage applications, firewalls, clusters, servers, load balancers, and other computing infrastructure on the cloud platform. However, deploying software releases for services provided on a cloud platform using a continuous delivery platform can be complex. For example, different versions of software may have to be deployed on different services running on different cloud computing resources. An error in the instructions for deployment may cause the incorrect version of a software artifact to be deployed for a service.

BRIEF DESCRIPTION OF DRAWINGS

FIG. 7 shows the overall process for generating pipelines for deployment of software artifacts on datacenters configured on a cloud platform according to an embodiment.

Figure 1:
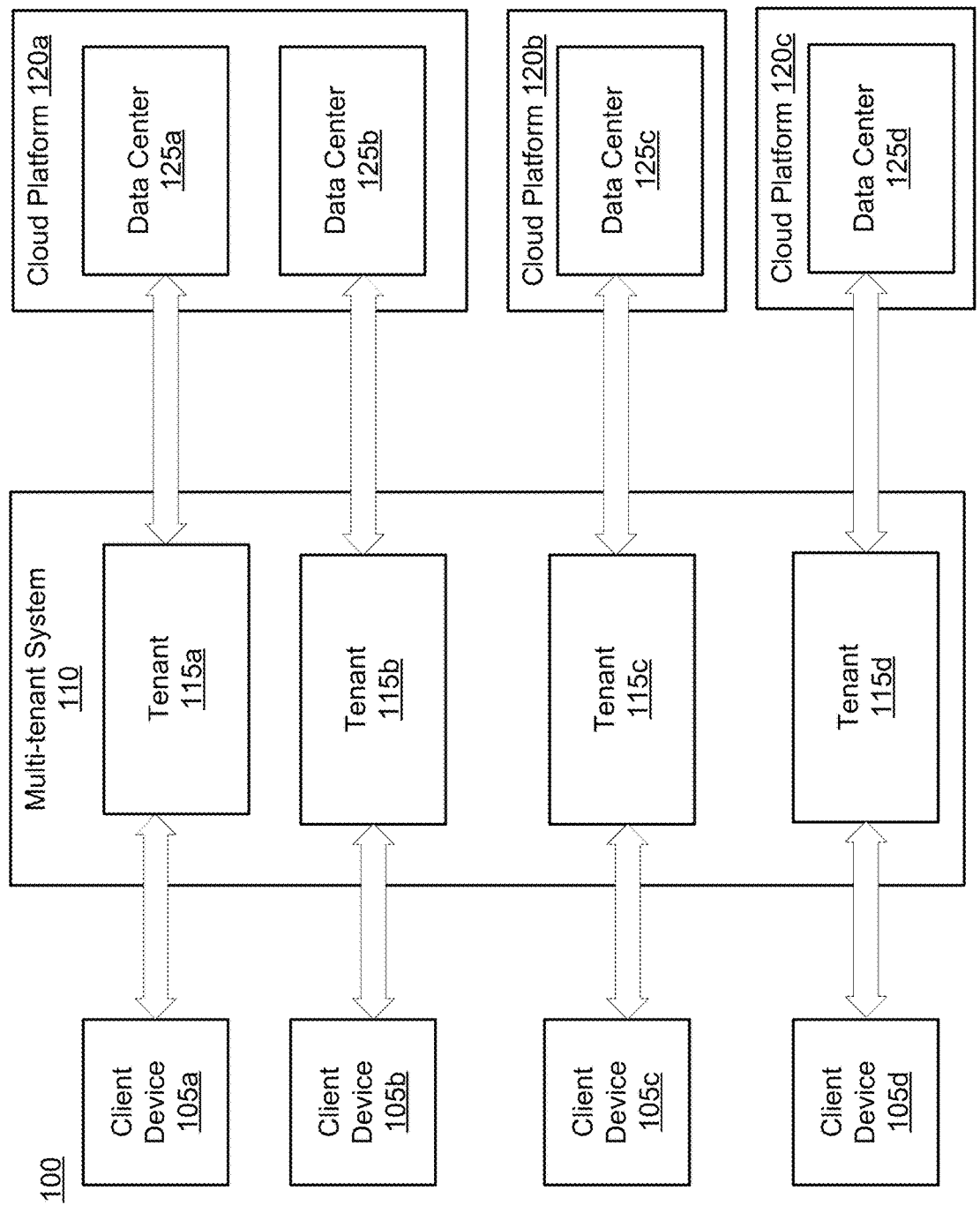
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments create data centers in a cloud platform using a cloud platform infrastructure language that is cloud platform independent. The system receives a cloud platform independent declarative specification of a data center. The declarative specification describes the structure of the data center and may not provide instructions specifying how to create the data center. The cloud platform independent declarative specification is configured to generate the data center on any of a plurality of cloud platforms and is specified using a cloud platform infrastructure language. The system receives information identifying a target cloud platform for creating the data center and compiles the cloud platform independent declarative specification to generate a cloud platform specific data center representation. The system sends the cloud platform specific data center representation and a set of instructions for execution on the target cloud platform. The target cloud platform executes the instructions to configure the data center using the platform specific data center representation. The system provides users with access to the computing resources of the data center configured by the cloud platform.

In one embodiment, the system performs operations related to software releases on datacenters configured on a cloud platform, for example, deploying software releases, provisioning resources, performing rollback of software releases, and so on. The system accesses a data center configured on a target cloud platform. The datacenter is generated based on a cloud platform independent declarative specification comprising a hierarchy of data center entities. Each data center entity comprises one or more of (1) a service or (2) one or more other data center entities. The system generates a cloud platform independent master pipeline that comprises: (1) a sequence of stages for deployment of a software artifact, for example, a development stage, a test stage, and a production stage, and (2) criteria for promoting the software artifact from one stage to a subsequent stage of the sequence of stages. The system compiles the cloud platform independent master pipeline to generate a cloud platform dependent detailed pipeline for the target cloud platform with instructions for performing operations related to services according to the layout of datacenter defined by the declarative specification. The system executes the cloud platform dependent detailed pipeline on the target cloud platform, for example, to deploy software releases on datacenter entities of the datacenter.

In one embodiment, the system accesses the data center configured on a target cloud platform. The system receives a cloud platform independent artifact version map associating data center entities of the data center with versions of software artifacts targeted for deployment on the datacenter entities. Each software artifact comprises executable instructions associated with a service configured for execution on one or more cloud platforms. The system generates a cloud platform specific master pipeline for the target cloud platform based on the cloud platform independent artifact version map. The cloud platform specific master pipeline comprises instructions to perform operations such as build and deploy appropriate versions of deployment artifacts for services on data center entities in accordance with the cloud platform independent version map. The system transmits the cloud platform specific deployment pipeline to the target cloud platform for execution. The artifact version map and the master pipelines can be used to perform various actions related to services including deployment of service, destroying services, provisioning resources for services, destroying resources for services, and so on.

The system according to an embodiment, allows service owners to define shared pipelines that can be invoked by multiple parent pipelines. The system generates and accesses a datacenter configured on the cloud platform. The system receives an artifact version map associating datacenter entities with services targeted for deployment on the datacenter entities. The artifact version map specifies attributes associated with (1) a first invocation of the shared pipeline for service S1 targeted for deployment on a datacenter entity D1 and (2) a second invocation of the shared pipeline for a service S2 targeted for deployment on a datacenter entity D2. The system generates deployment pipelines based on the artifact version map. The deployment pipelines are configured to build and deploy services on the cloud platform. The deployment pipelines include (1) a parent pipeline P1 invoking the shared pipeline, the parent pipeline P1 targeted for deployment of the service S1 on the datacenter entity D1 and (2) a parent pipeline P2 invoking the shared pipeline, the parent pipeline P2 targeted for deployment of the service S2 on the datacenter entity D2. The system transmits the deployment pipelines to the cloud platform for execution.

According to an embodiment, the shared pipeline deploys a set of software artifacts. The artifact version map specifies (1) a set SV1 of versions of the set of deployment artifacts of the shared pipeline for the datacenter entity D1 and (2) a set SV2 of versions of the set of deployment artifacts of the shared pipeline for the datacenter entity D2. The parent pipeline P1 is configured to build and deploy (1) the set SV1 of versions of the set of deployment artifacts for the first invocation of the shared pipeline on the datacenter entity D1 and (2) the set SV2 of versions of the set of deployment artifacts for the second invocation of the shared pipeline on the datacenter entity D2.

According to an embodiment, at least one of the values from the one or more values represent a version of the shared pipeline. The artifact version map specifies a version Vx of the shared pipeline and a version Vy of the shared pipeline, wherein the parent pipeline P1 invokes the version Vx of the shared pipeline and the parent pipeline P2 invokes the version Vy of the shared pipeline.

According to an embodiment, at least one of the values from the one or more values represent a parameter specified by the shared pipeline. The parent pipeline P1 specifies an override value OV1 of the parameter of the shared pipeline and the parent pipeline P2 specifies an override value OV2 of the parameter of the shared pipeline.

According to an embodiment, at least one of the values from the one or more values is associated with a promotion criteria for promoting a particular software artifact from a first environment to a second environment. The one or more deployment pipelines invoke the shared pipeline such that (1) the parent pipeline P1 causes the shared pipeline to implement a promotion criteria C1 and (2) the parent pipeline P2 causes the shared pipeline to implement a promotion criteria C2.

A cloud platform is also referred to herein as a substrate. The declarative specification of data center is substrate independent or substrate agnostic. If operations related to a datacenter such as deployment of software releases, provisioning of resources, and so on are performed using conventional techniques, the user has to provide cloud platform specific instructions. Accordingly, the user needs expertise of the cloud platform being used. Furthermore, the instructions are cloud platform specific and are not portable across multiple platforms. For example, the instructions for deploying software on an AWS cloud platform are different from instructions on a GCP cloud platform. A developer needs to understand the details of how each feature is implemented on that specific cloud platform. The system disclosed provides a cloud platform infrastructure language that allows users to perform operations on datacenters using instructions that are cloud platform independent and can be executed on any cloud platform selected from a plurality of cloud platforms. A compiler of the cloud platform infrastructure language generates a cloud platform specific detailed instructions for a target cloud platform.

The cloud platform infrastructure language may be referred to as a domain specific language (DSL). The system may represent a multi-tenant system but is not limited to multi-tenant systems and can be any online system or any computing system with network access to the cloud platform. Systems and method describing deployment of artifacts in cloud platforms are described in U.S. patent application Ser. No. 17/110,224 filed on Dec. 2, 2020, and U.S. patent application Ser. No. 17/307,913 filed on May 4, 2021, each of which is hereby incorporated by reference by its entirety.

System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105.

A cloud platform may also be referred to as a cloud computing platform or a public cloud environment. A tenant may use the cloud platform infrastructure language to provide a declarative specification of a datacenter that is created on a target cloud platform 120 and to perform operations using the datacenter, for example, provision resources, perform software releases and so on. A tenant 115 may create one or more data centers on a cloud platform 120. A data center represents a set of computing resources including servers, applications, storage, memory, and so on that can be used by users, for example, users associated with the tenant. Each tenant may offer different functionality to users of the tenant. Accordingly, each tenant may execute different services on the datacenter configured for the tenant. The multi-tenant system may implement different mechanisms for release and deployment of software for each tenant. A tenant may further obtain or develop versions of software that include instructions for various services executing in a datacenter. Embodiments allow the tenant to deploy specific versions of software releases for different services running on different computing resources of the datacenter.

The computing resources of a data center are secure and may not be accessed by users that are not authorized to access them. For example, a data center 125a that is created for users of tenant 115a may not be accessed by users of tenant 115b unless access is explicitly granted. Similarly, data center 125b that is created for users of tenant 115b may not be accessed by users of tenant 115a, unless access is explicitly granted. Furthermore, services provided by a data center may be accessed by computing systems outside the data center, only if access is granted to the computing systems in accordance with the declarative specification of the data center.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2A:
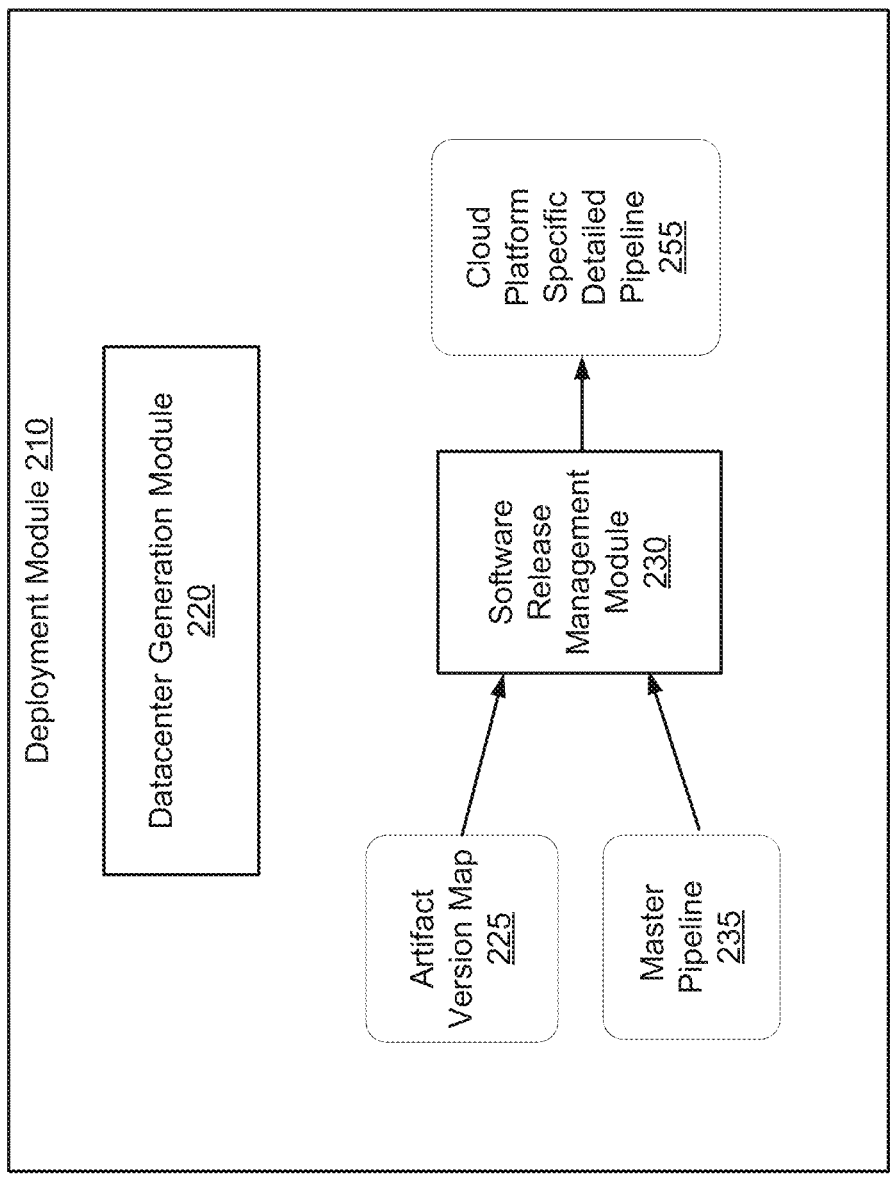
FIG. 2A is a block diagram illustrating the system architecture of a deployment module 210 according to an embodiment.

The multi-tenant system 110 includes a deployment module for deploying software artifacts on the cloud platforms. The deployment module can perform various operations associated with software releases, for example, provisioning resources on a cloud platform, deploying software releases, performing rollbacks of software artifacts installed on datacenter entities, and so on. FIG. 2A is a block diagram illustrating the system architecture of a deployment module 210 according to an embodiment. The deployment module 210 includes a data center generation module 220 and a software release management module 230. Other embodiments can have different and/or other components than the ones described here, and that the functionalities can be distributed among the components in a different manner.

The data center generation module 220 includes instructions for creating datacenters on the cloud platform. The software release management module 230 includes instructions for deploying software releases for various services or applications running on the datacenters created by the data center generation module 220.

Figure 4:
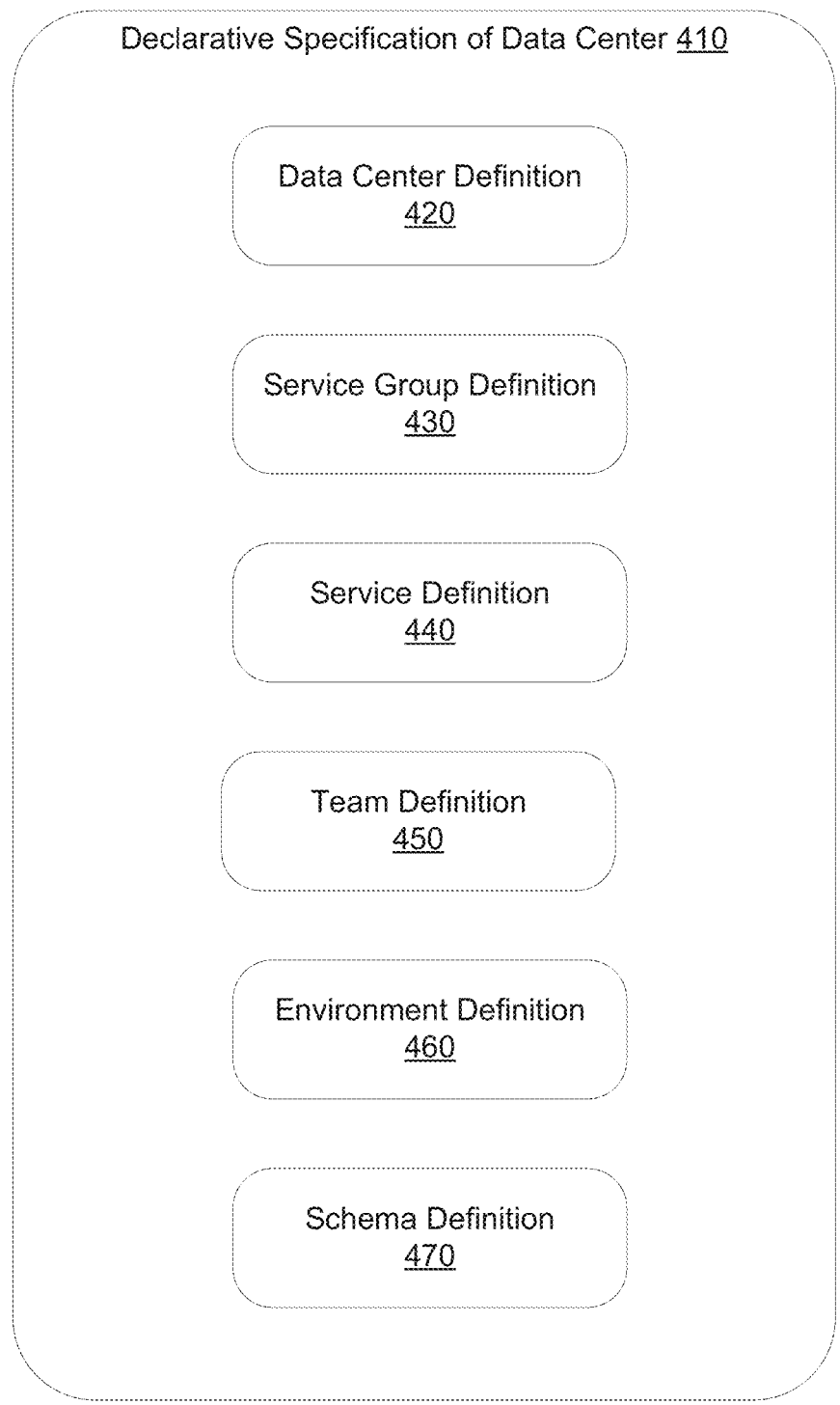
FIG. 4 illustrates an example of a data center declarative specification according to one embodiment.

The data center generation module 220 receives from users, for example, users of a tenant, a cloud platform independent declarative specification of a data center. The cloud platform independent declarative specification of a data center specifies various entities of the data center. In an embodiment, the cloud platform independent declarative specification of a data center comprises a hierarchical organization of datacenter entities, where each datacenter entity may comprise one or more services, one or more other datacenter entities or a combination of both. FIG. 4 describes various types of datacenter entities in further detail. The data center generation module 220 receives the platform independent declarative specification and a target cloud platform as input and generates a cloud platform specific metadata representation for the target cloud platform. The data center generation module 220 deploys the generated cloud platform specific metadata representation on the target cloud platform to create a data center on the target cloud platform according to the declarative specification.

The software release management module 230 receives as inputs (1) an artifact version map 225 and (2) a master pipeline 235. The artifact version map 225 identifies specific versions of software releases or deployment artifacts that are targeted for deployment on specific datacenter entities. The artifact version map 225 maps datacenter entities to software release versions that are targeted to be deployed on the datacenter entities. The master pipeline 235 includes instructions for operations related to software releases on the datacenter, for example, deployment of services, destroying services, provisioning resources for services, destroying resources for services, and so on.

The master pipeline 235 may include instructions for performing operations related to software releases for different environments such as development environment, test environment, canary environment, and production environment, and instructions for determining when a software release is promoted from one environment to another environment. For example, if the deployments of a software release in a development environment execute more than a threshold number of test cases, the software release is promoted for test environment for further testing, for example, system level and integration testing. If the software release in a test environment passes a threshold of test coverage, the software release is promoted to canary environment where the software release is provided to a small subset of users on a trial basis. If the software release in a canary environment executes without errors for a threshold time, the software release is promoted to production environment where the software release is provided to all users.

The software release management module 230 compiles the input artifact version map 225 and the master pipeline 235 to generate a cloud platform specific detailed pipeline 255 that is transmitted to the target cloud platform. The cloud platform specific detailed pipeline 255 includes instructions for deploying the appropriate version of a software release or deployment artifact on the datacenter entities as specified in the artifact version map 225. The software release management module 230 may receive modifications to one of the inputs. For example, a user may modify the input artifact version map 225 and provide the same master pipeline 235. Accordingly, the same master pipeline is being used but different software releases are being deployed on datacenter entities. The software release management module 230 recompiles the inputs to generate a new cloud platform specific detailed pipeline 255 that deploys the versions of software releases according to the new artifact version map 225.

The artifact version map may also be referred to as a deployment manifest, a deployment version map, a version manifest, a software release map, or a software artifact version map. The master pipeline may also be referred to as a master deployment pipeline or a master orchestration pipeline.

Figure 2B:
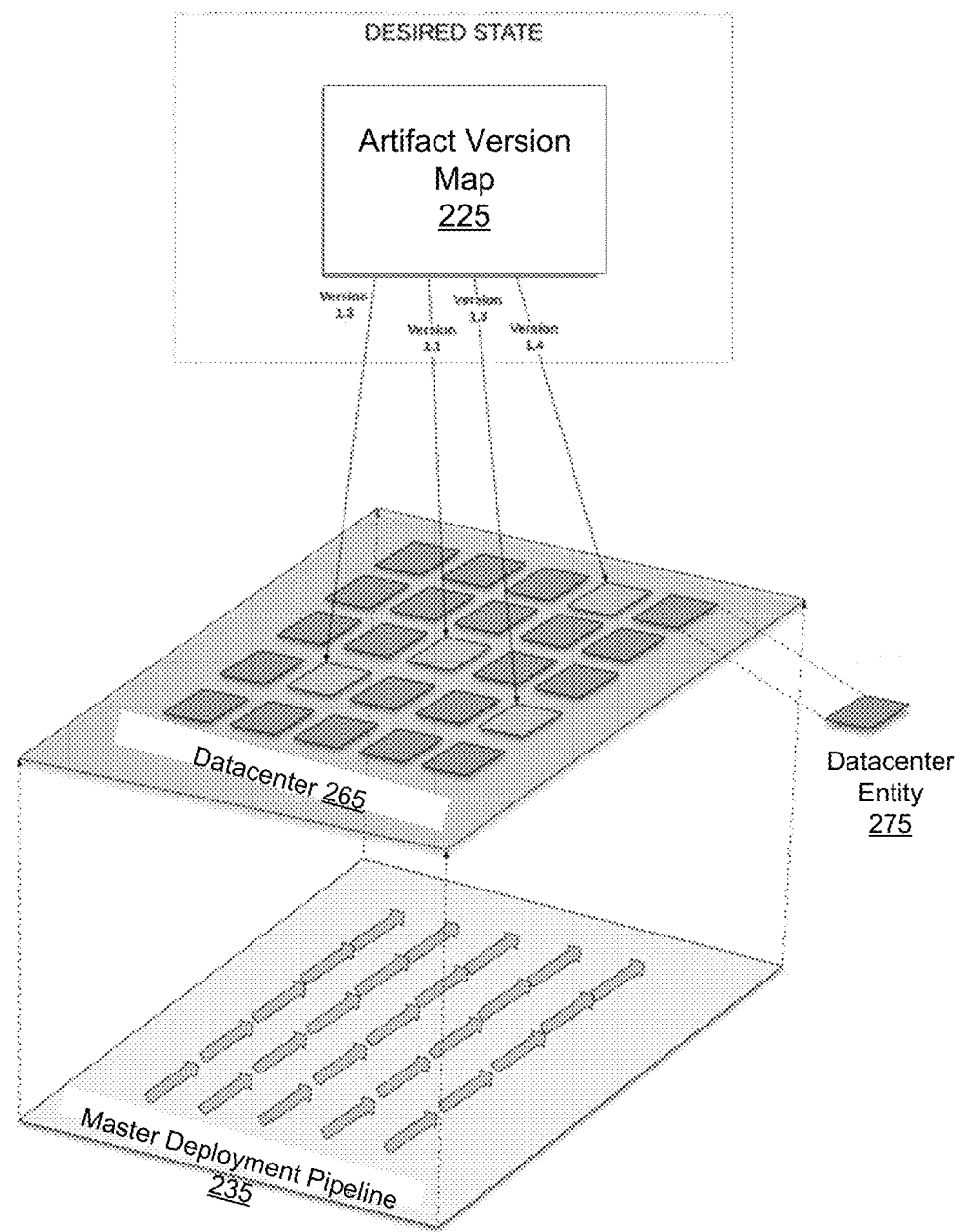
FIG. 2B illustrates the overall process for deploying software artifacts in a datacenter according to an embodiment.

FIG. 2B illustrates the overall process for deploying software artifacts in a datacenter according to an embodiment. FIG. 2B shows a layout of a datacenter 265 including various datacenter entities. As shown in FIG. 2B, the artifact version map 225 identifies the different versions of software that are targeted for release on different datacenter entities 275 of the datacenter 265. The master pipeline represents the flow of deployment artifacts through the various environments of the datacenter. The software release management module 230 combines the information in the master pipeline 235 with the artifact version map 225 to determine cloud platform specific detailed pipeline 255 that maps the appropriate version of software artifacts on the datacenter entities according to the artifact version map 225.

Figure 3:
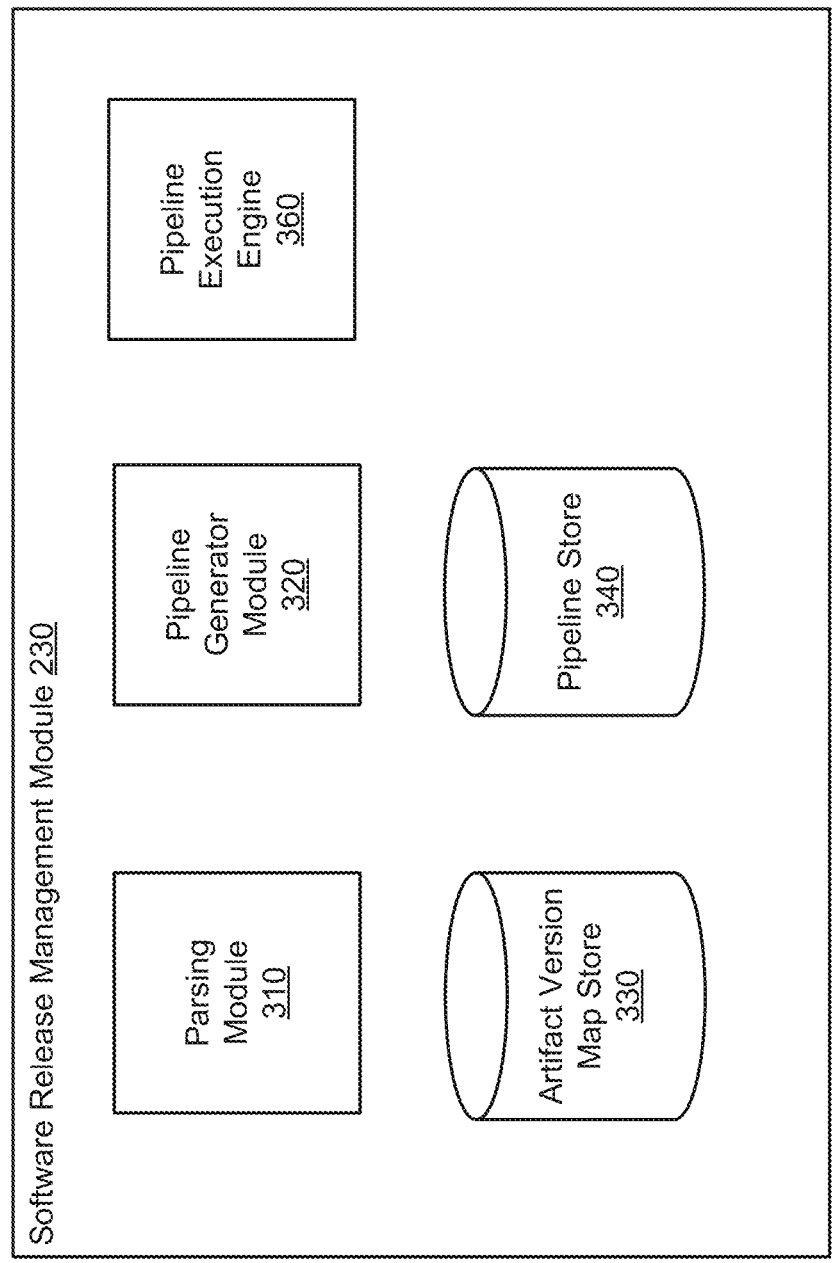
FIG. 3 is a block diagram illustrating the architecture of a software release management module according to one embodiment.

FIG. 3 is a block diagram illustrating the architecture of a software release management module 230 according to one embodiment. The software release management module 230 includes a parsing module 310, a pipeline generator module 320, an artifact version map store 330, a pipeline store 340, and a pipeline execution engine 360. Other embodiments may include more, fewer, or different modules than those indicated herein in FIG. 3.

The parsing module 310 parses various types of user input including declarative specification of a data center, artifact version map 225, and master pipelines 235. The parsing module 310 generates data structures and metadata representations of the input processed and provides the generated data structures and metadata representations to other modules of the software release management module 230 for further processing.

The metadata store 340 stores various transformed metadata representations of data centers that are generated by the software release management module 230. The transformed metadata representations may be used for performing rollback to a previous version if an issue is encountered in a current version of the data center. The transformed metadata representations may be used for validation, auditing, governance, and so on at various stages of the transformation process.

The pipeline generator module 320 processes the master pipelines in conjunction with the artifact version map received as input to generate a detailed pipeline for a target cloud platform. The pipelines comprise stages that include instructions for provisioning services or deploying applications for deploying versions of software releases for various services on the cloud platform according to the artifact version map. The artifact version map store 330 stores artifact version maps received from users and the pipeline store 340 stores master pipelines as well as pipelines generated by the pipeline generator module 320.

The pipeline execution engine 360 executes the detailed pipelines generated by the pipeline generator module 320. In an embodiment, the pipeline execution engine 360 is a system such as SPINNAKER that executes pipelines for releasing/deploying software. The pipeline execution engine 360 parses the pipelines and executes each stage of the pipeline on a target cloud computing platform.

Cloud Platform-Based Data Center Generation

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 520 represents a set of capabilities and features and services offered by one or more computing systems that can be built and delivered independently, in accordance with one embodiment. A service group may be also referred to as a logical service group, a functional unit, or a bounded context. A service group 520 may also be viewed a set of services of a set of cohesive technical use-case functionalities offered by one or more computing systems. A service group 520 enforces security boundaries. A service group 520 defines a scope for modifications. Thus, any modifications to an entity, such as a capability, feature, or service offered by one or more computing systems within a service group 520 may propagate as needed or suitable to entities within the service group, but does not propagate to an entity residing outside the bounded definition of the service group 520. A data center may include multiple service groups 520. A service group definition 430 specifies attributes including a name, description, an identifier, schema version, and a set of service instances. An example of a service group is a blockchain service group that includes a set of services used to provide blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [ ],
      "description": "Service group Service Instance Definitions"
      "service_group_id": "id1",
      "name": "name1",
      "schema_version": "1.0",
      "cluster_instances": [
        {
          "cluster_instance_name": "cluster1",
          "cluster_type": "cluster_type1"
        },
        {
          "cluster_instance_name": " cluster2",
          "cluster_type": " cluster_type1"
        },
        {
          "cluster_instance_name": " clusters",
          "cluster_type": " cluster_type2"
        }
      ],
      "service_instances": [
        {
          "service_instance_name": "serviceinstance0001",
          "service_type": "servicetype1"
        },
        {
          "service_instance_name": "serviceinstance0002",
          "service_type": " servicetype1"
          "cluster_instance": " cluster1"
        },
        {
          "service_instance_name": "serviceinstance0003",
          "service_type": " servicetype2"
        },
        ...
      ],
      "service_teams": ["team1"],
      "type": "servicetype"
      "security_groups":[
        {
          "name":"group1",
          "policies":[
            {
              "description":"Allow access from site S1"
              "destination":{ "groups":[ "group2" ] },
              "environments":[ "dev", "test", "staging" ]
              "source":{
                "iplist":"URL1",
                "filters":[ filter-expression" ]
              }
            }
          ]
        }
      ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition 440 specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition 440 specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
    "service_definition": [
        {
            "authorized_clients": [ ],
            "build_dependencies": [ ],
            "description": "description of service"
            "dns_name": "dns1",
            "documentation": "URL",
            "name": "name1",
            "namespace": "space1",
            "service_owner": "user1",
            "service_status": "GA",
            "service_team": "team1",
            "support_level": "STANDARD",
            "start_dependencies": ["svc5", "svc7", ...],
            "sub_services": [ "service1", " service2", " service3", ... ],
            "listening_ports":[
                { "protocol":"tcp", "ports":[ "53" ] },
                { "protocol":"udp","ports":[ "53"] }
            "outbound_access":[
                {
                    "destination":[
                        {
                            "endpoints":[ ".xyz.com:443", ".pqr.com:443" ]
                        }
                    ]
                }
            ],
        }
    ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group. Embodiments decouple the team definition from the constructions that define the data center entity, thereby reducing the impact of the teams on the design and architecture of the data center entity.

```
{
  "team definition": [
    {
      "name": "team1",
      "description": "description of team",
      "admins": [
        "user1",
        "user2",
        "user3",
        "user4",
        ...
      ],
      "team_id": "id1",
      "owner": "owner_id",
      "email": "team1@xyz.com",
    }
  ],
  "communication_channel": "channel1"
  "schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
  "datacenter_instance": {
    "environment": "env1",
    "datacenter_instance_identifier": "id1"
    "name": "data_center1",
    "region": "region1",
    "service_groups": [
      "service_group1",
      " service_group2",
      " service_group3",
      "service_group4",
      ...
    ],
    "schema_version": "1.0",
    "admin_team": "admins",
    ...
  }
}
```

Figure 5:
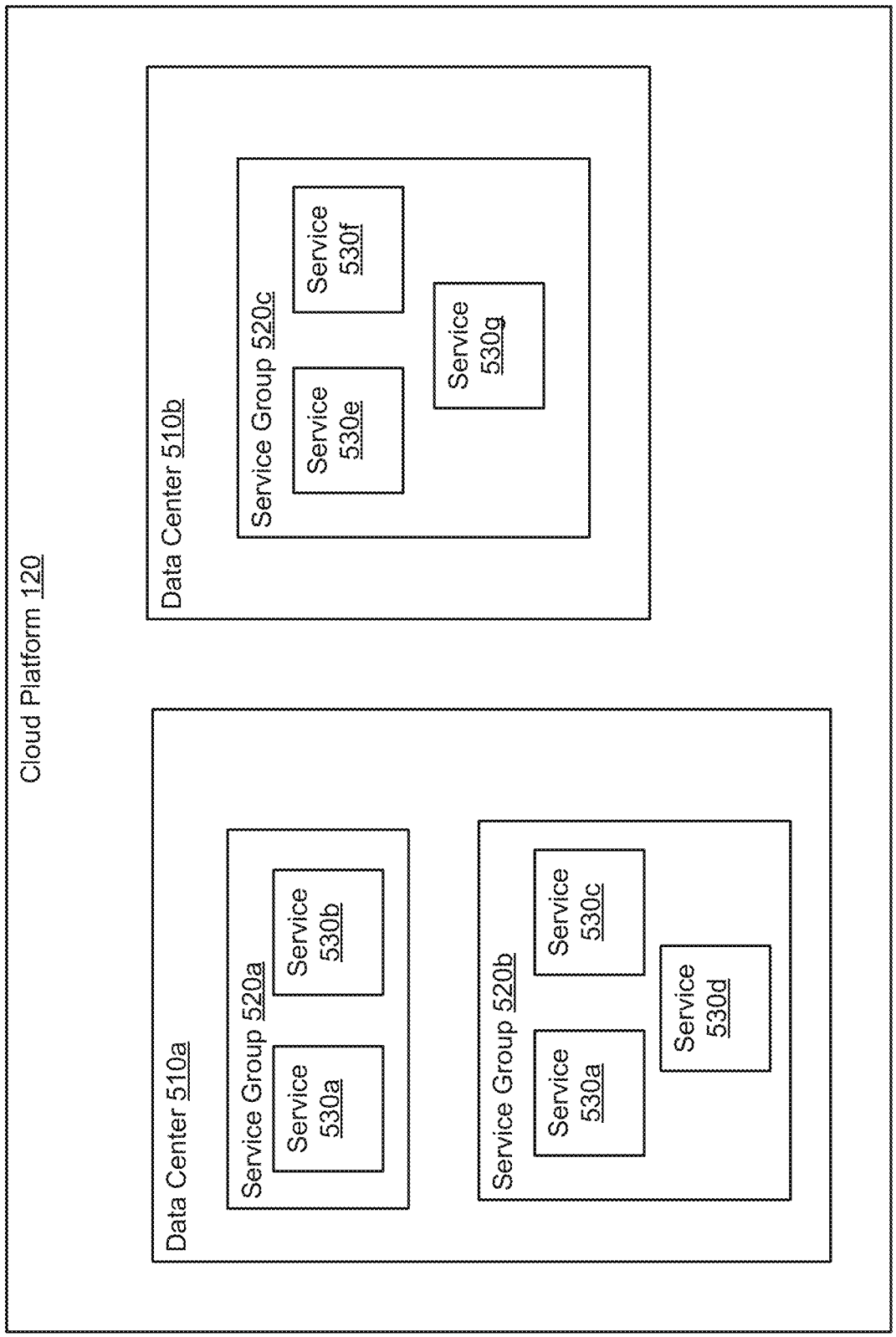
FIG. 5 illustrates example data centers created on a cloud platform based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510a includes service groups 520a and 520b and data center 510b includes service group 520c. A data center may include multiple instances of a particular type of service group. Each service group includes a set of services. For example, service group 520a includes services 530a and 530b, service group 520b includes services 530a, 530c, and 530d, and service group 520c includes services 530e, 530f, and 530g. A service group may include multiple instances of services of the same service type.

The datacenter generation module 220 creates data centers on cloud platforms based on a declarative specification using the following steps. The data center generation module 210 receives a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends the platform specific data center representation along with instructions for deploying the data center on the target cloud computing platform. The target cloud computing platform executes the instructions to configure the computing resources of the target cloud computing platform to generate the data center according to the platform specific data center representation. The data center generation module 210 provides users with access to the computing resources of the data center configured by the cloud computing platform. For example, if the data center was created for a tenant of the multi-tenant system, users associated with the tenant are provided with access to the data center.

Figure 6:
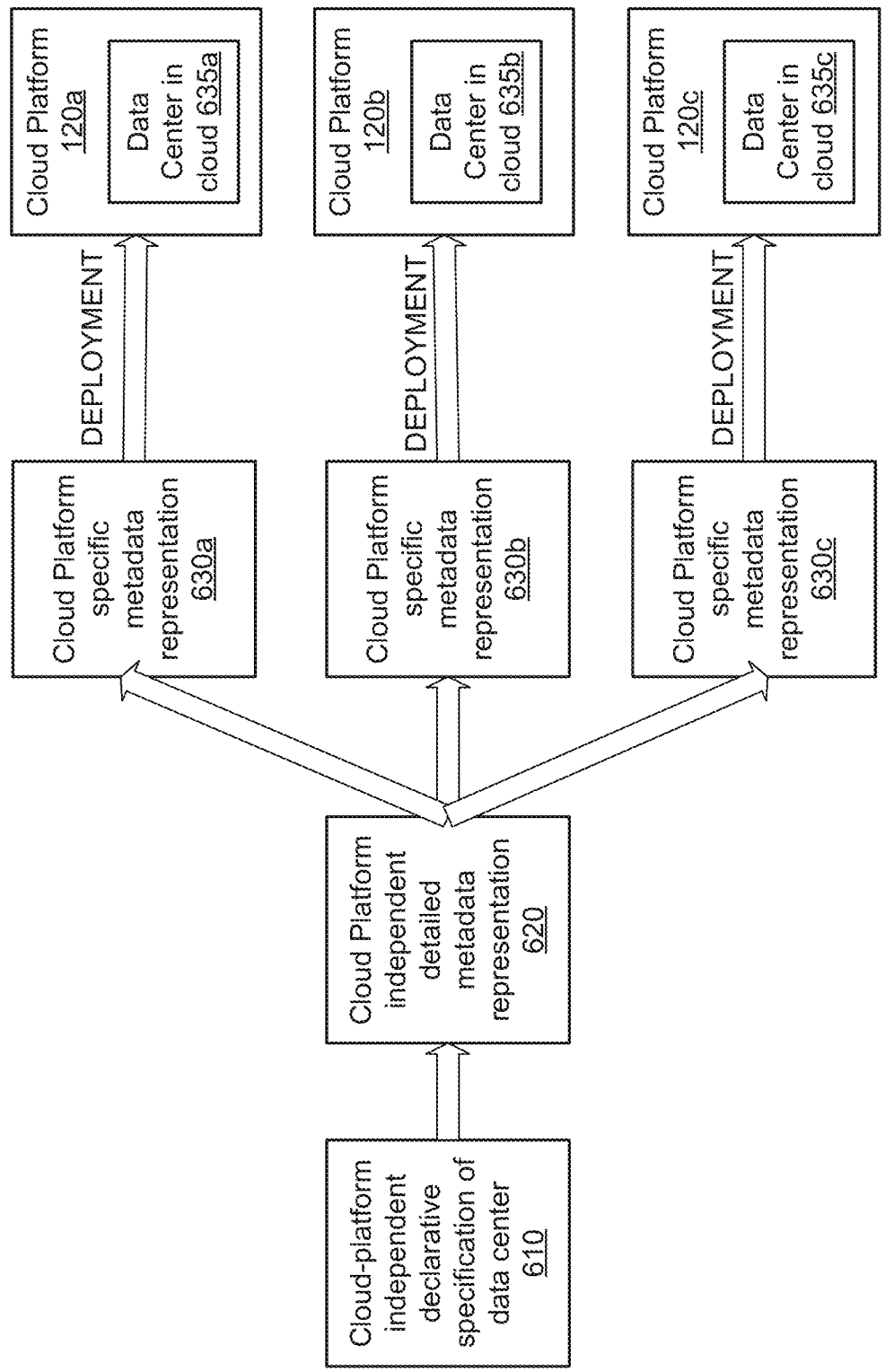
FIG. 6 is a block diagram illustrating generation of data centers on cloud platforms based on a declarative specification, according to one embodiment.

FIG. 6 is a block diagram illustrating generation of data centers on cloud platforms based on a declarative specification, according to one embodiment. The data center generation module 210 receives as input a cloud-platform independent declarative specification 610. The cloud-platform independent declarative specification 610 may be a version of the declarative specification that is being incrementally modified by users. The data center generation module 210 processes a particular version of the cloud-platform independent declarative specification 610. Since cloud-platform independent declarative specification 610 is not specified for any specific target cloud platform, the data center generation module 210 can configure a data center on any target cloud platform based on the cloud-platform independent declarative specification 610.

The data center generation module 210 processes the cloud-platform independent declarative specification 610 to generate a cloud-platform independent detailed metadata representation 620 for the data center. The cloud-platform independent detailed metadata representation 620 defines details of each instance of data center entity specified in the cloud-platform independent declarative specification 610. The data center generation module 210 creates unique identifiers for data center entity instances, for example, service instances.

In an embodiment, the cloud-platform independent detailed metadata representation 620 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 620 includes attributes of each instance of data center entity. Accordingly, the description of each instance of data center entity is expanded to include all details. As a result, the cloud-platform independent detailed metadata representation 620 of a data center may be significantly larger than the cloud-platform independent declarative specification 610. For example, the cloud-platform independent declarative specification 610 may be few thousand lines of specification, whereas the cloud-platform independent detailed data center representation 620 may be millions of lines of generated code. As a result, the data center generation module 210 keeps the cloud-platform independent detailed metadata representation 620 as immutable, i.e., once the representation is finalized, no modifications are performed to the representation. For example, if any updates, deletes, or additions of data center entities need to be performed, they are performed on the cloud platform independent declarative specification 610.

The data center generation module 210 receives a target cloud platform on which the data center is expected to be provisioned and deployed and generates a cloud platform specific detailed metadata representation 630 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 620 to obtain the cloud platform specific metadata representation 630 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 630. For example, the cloud platform independent declarative specification may specify permitted interactions between services. These permitted interactions are specified in the cloud-platform specific detailed metadata representation 630 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The data center generation module 220 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 220 creates trust relationships between user accounts that allow services to access other services via secure communication channels. These trust relationships are generated using substrate specific instructions generated based on the declarative specification, for example, based on outbound access attributes specified for services. The data center generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 210 deploys the cloud platform specific metadata representation 630 on the specific target cloud platform for which the representation was generated. The data center generation module 210 may perform various validations using the generated metadata representations, including policy validations, format validations, and so on.

The cloud platform independent declarative specification 610 may be referred to as a declared data center representation, cloud-platform independent detailed metadata representation 620 referred to as a derived metadata representation of the data center, and cloud platform specific metadata representation 630 referred to as a hydrated metadata representation of the data center.

Overall Process for Deployment of Software Artifacts on a Datacenter

FIG. 7 shows the overall process for generating pipelines for deployment of software artifacts on datacenters configured on a cloud platform according to an embodiment. The datacenter generation module generates 710 one or more datacenters on a target cloud platform. Each datacenter is generated from a cloud platform independent declarative specification and has a hierarchy of datacenter entities.

The software release management module 230 generates 720 a cloud platform independent master pipeline. In an embodiment, the cloud platform independent master pipeline includes stages corresponding to environments of the datacenters, for example, development environment, test environment, canary environment, and production environment. The master pipeline composes a sequence of progressive and/or conditional deployment across various environments such as development environment, test environment, staging environment, or production environment. The master pipeline may be triggered by delivery of the image for a software artifact and includes stages or instructions to deploy the build in environments of type development. The software artifact that is built is conditionally promoted to one or more test environments, followed by one or more canary environments before eventually getting deployed to production environments. The master pipeline may be customized by users, for example, service owners to represent a specific orchestration across environments. The master pipeline may be customized to capture specific promotion criteria for moving from one stage to next. For example, different tenants of the multi-tenant system may customize the master pipeline in a different manner. In an embodiment, the master pipeline by default uses the latest version of software for a software artifact for a service and builds and deploys the version across various environments. The user can use the artifact version map to ensure that a specific version of a software artifact is deployed on specific datacenter entities.

In an embodiment, each service deployed in the datacenter has a cloud platform independent master pipeline generated from the datacenter entities as defined by the declarative specification of the datacenter, for example, master pipeline for datacenter instances, master pipeline for service groups, master pipeline for cells, master pipeline for services, and so on. The master pipelines may be triggered on delivery of images of software artifacts. The master pipelines may implement a service owner-controlled continuous deployment. The master pipelines may implement datacenter instance owner-owned or release owner-owned on-demand deployment.

Certain portions of the master pipeline may be customized by the users, for example, by tenants of a multi-tenant system that are deploying services on a datacenter. For example, the promotion decision pipeline may be customized by a tenant to determine which test cases are executed and what threshold is The software release management module 230 receives 730 customizations to logic for promoting a software artifact from one stage to another stage of the cloud platform independent master pipeline.

The software release management module 230 compiles 740 the cloud platform independent master pipeline to generate a cloud platform specific detailed deployment pipeline that is specific to the hierarchy of datacenter entities of each datacenter as specified by the cloud platform independent declarative specification for the datacenter.

The software release management module 230 further receives 750 code for releasing one or more features of services deployed on the datacenter. The software release management module 230 executes 760 the cloud platform specific detailed deployment pipeline to deploy software artifacts based on the received code.

Figure 8:
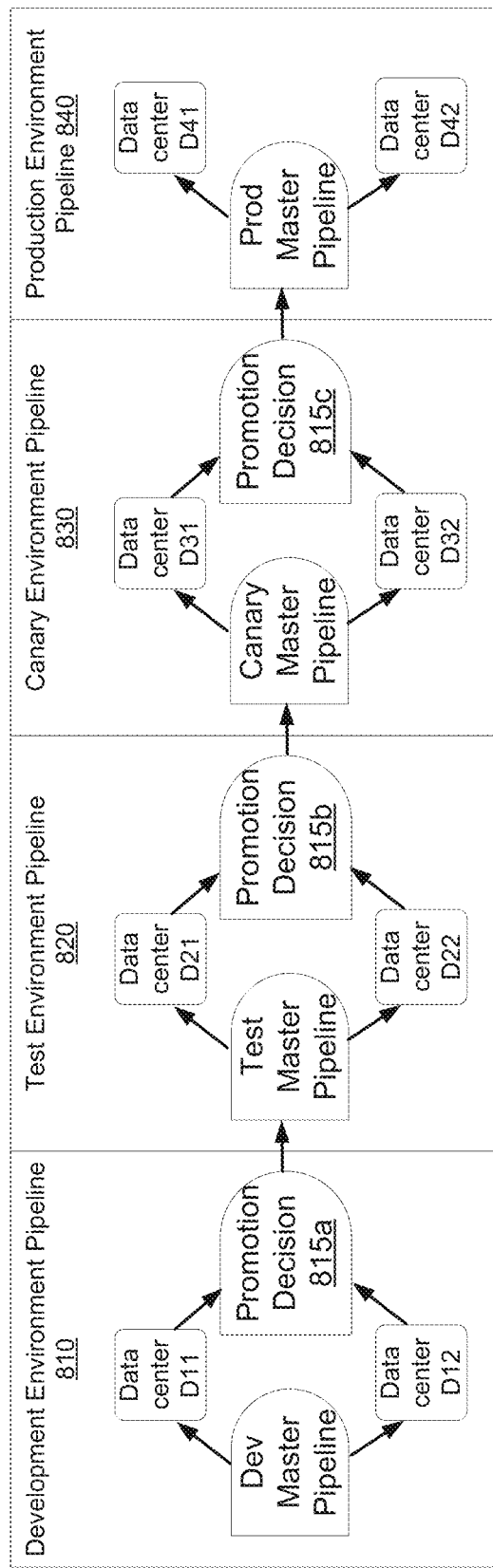
FIG. 8 illustrates an example master pipeline according to an embodiment.

FIG. 8 illustrates an example master pipeline 800 according to an embodiment. A master pipeline represents a sequence of stages that represent progressive conditional deployment across various datacenter environments. FIG. 8 shows stages for different environments of datacenter including development environment, test environment, canary environment, and production environment. Each stage further represents a pipeline that is executed for that stage. Accordingly, the master pipeline 800 includes a development environment pipeline 810 which feeds into a test environment pipeline 820, which feeds into a canary environment pipeline 830, which feeds into production environment pipeline 840.

The pipeline at each stage is a hierarchical pipeline comprising lower level pipelines. For example, the development environment pipeline 810 comprises a development master pipeline that feeds into datacenter pipelines D11, D12, . . . , depending on the number of datacenters specified as having development environment in the declarative specification of the datacenters.

The test environment pipeline 820 comprises a test master pipeline that feeds into datacenter pipelines D21, D22, . . .

, depending on the number of datacenters specified as having test environment in the declarative specification of the datacenters.

The canary environment pipeline 820 comprises a canary master pipeline that feeds into datacenter pipelines D31, D32, . . . , depending on the number of datacenters specified as having canary environment in the declarative specification of the datacenters.

The production environment pipeline 820 comprises a production master pipeline that feeds into datacenter pipelines D21, D22, . . . , depending on the number of datacenters specified as having test environment in the declarative specification of the datacenters.

Each environment pipeline 810, 820, 830 includes a promotion decision pipeline 815a, 815b, 815c respectively. The outputs of the datacenter pipelines of the environment pipeline are collected by the promotion decision pipeline 815 that determines whether the software artifact is ready for promotion to the next stage. The promotion decision pipeline 815 may determine based on test case results obtained by the datacenters whether the software artifact for the service is promoted to the next stage. For example, if more than a threshold test cases are passed, the promotion decision pipeline 815 promotes the software artifact to the next stage. The last environment stage, for example, the production environment pipeline may not have a promotion decision pipeline since there is no subsequent stage to which the software artifact needs to be promoted. As shown in FIG. 8, the promotion decision pipeline 815a of development environment pipeline determines whether to promote the software artifact from development stage to test stage; the promotion decision pipeline 815b of test environment pipeline determines whether to promote the software artifact from test stage to canary stage, and the promotion decision pipeline 815c of canary environment pipeline determines whether to promote the software artifact from canary stage to production stage.

A master pipeline comprises multiple pipelines, for example, a provisioning pipeline for provisioning resources of the target cloud platform and a deployment pipeline for deploying a software artifact on a data center entity. Each pipeline comprises a sequence of stages, each stage representing one or more actions that need to be performed by the target cloud platform towards provisioning and deploying of the data center. The data center generation module 210 generates detailed pipelines for deploying versions of software artifacts on datacenter entities.

In an embodiment, the pipeline generator module 320 generates detailed pipelines using pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

In one embodiment, the pipeline generator module 320 generates pipelines in a hierarchical fashion based on the hierarchy of the data center entities of the data center. For example, the data center comprises data center entities of different types including data centers, service groups, services, and so on. A data center entity may include one or more child data center entities. For example, a data center includes one or more service groups as child data center entities. A service group includes one or more services as child data center entities. Accordingly, the data center generation module 210 starts at a data center entity at a level of the hierarchy and generates pipelines of data center entities below that level. For example, the pipeline generator module 320 starts at the data center level and generates pipelines for service groups within the data center. For each service group, the pipeline generator module 320 generates pipelines for services within the service group.

The process for executing pipelines according to one embodiment is as follows. The software release deployment module 230 receives a request to deploy a software artifact on a set of data center entities in the target cloud platform. The software release deployment module 230 executes the master pipeline for one or more datacenters. The software release deployment module 230 executes the aggregate pipelines for each service group of each datacenter. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Figure 9:
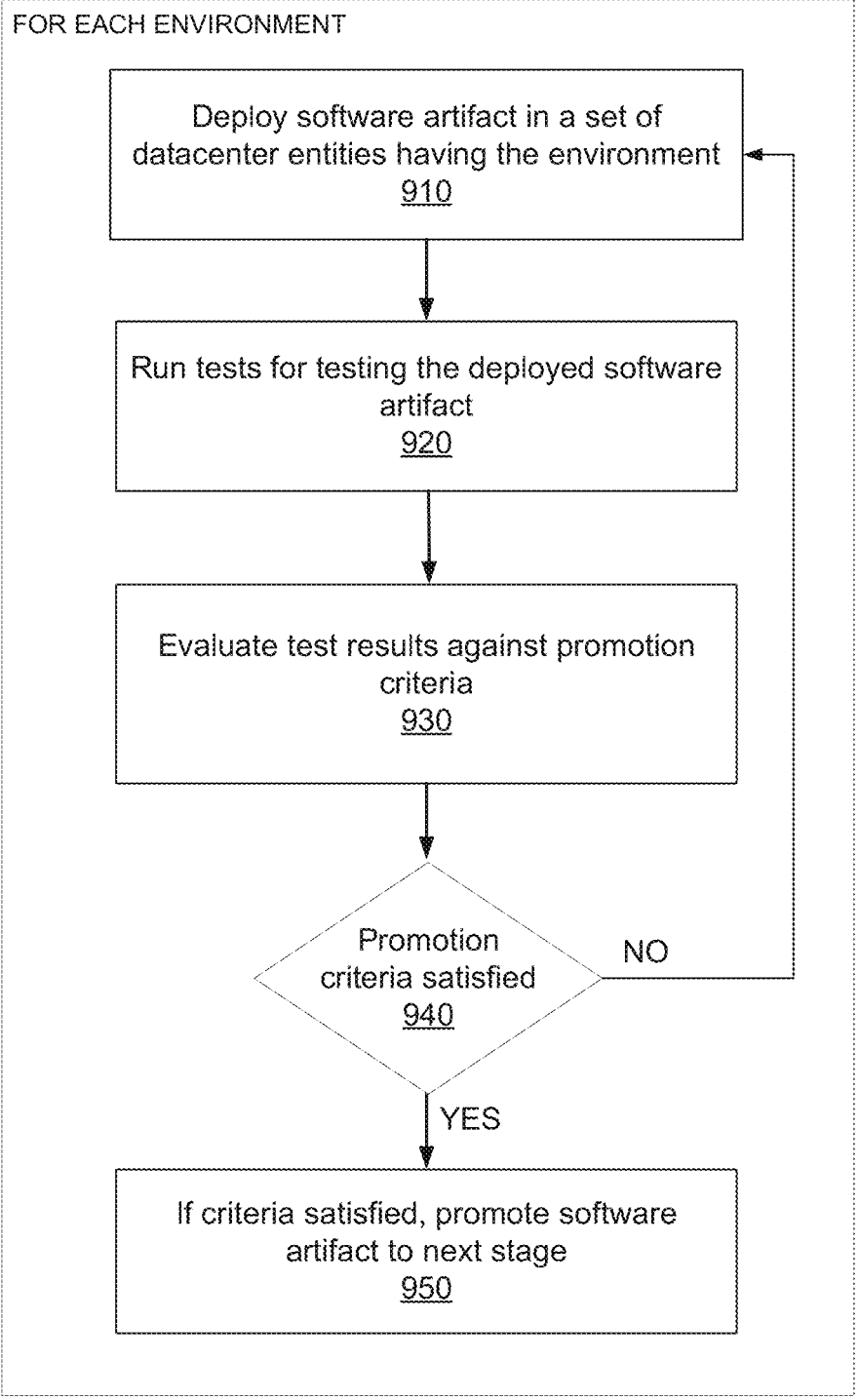
FIG. 9 shows the overall process executed by a stage for an environment of the master pipeline on a cloud platform according to an embodiment.

FIG. 9 shows the overall process executed by a stage for an environment of the master pipeline on a cloud platform according to an embodiment. The steps 910, 920, 930, 940, and 950 may be performed by each environment pipeline 810, 820, 830. The production environment pipeline 3 may execute only steps 910 and 920. The steps shown in FIG. 9 may be performed for one service or for multiple services specified using a manifest file.

The environment pipeline for an environment E includes instructions to deploy 910 the software on a set of datacenter entities, for example, a set of datacenter entities specified as having the environment E. In an embodiment, the software artifact is generated by compiling source code for a service. The source code may be obtained from a version control software. The set of datacenter entities may include datacenter instances, service groups, cells, services, or any combination of these.

The environment pipeline for the environment E further includes instructions for running 920 tests for testing the deployed software artifact on the set of datacenter entities. The environment pipeline for the environment E further includes instructions for evaluating 930 the test results against promotion criteria, for example, using the promotion decision pipeline 815. If the promotion criteria are not satisfied, the steps 910, 920, 930, and 940 may be repeated using a revised software artifact, for example, a software artifact generated from source code that includes fixes for certain defects identified during the testing 920. The environment pipeline for the environment E further includes instructions for proceeding 950 to the next stage if the promotion criteria are satisfied.

In an embodiment, the master pipeline comprises a hierarchy of pipelines. The hierarchy comprises multiple levels and pipelines at a particular level include pipelines of the next lower level as children pipelines. For example, at the highest level of hierarchy the master pipeline includes a release master pipeline that deploys a set of services related to a product. The next level of hierarchy includes service master pipelines that represent all deployments of a particular service across various environments. The next level of hierarchy may include service group master pipelines followed by service master pipelines.

Figure 10:
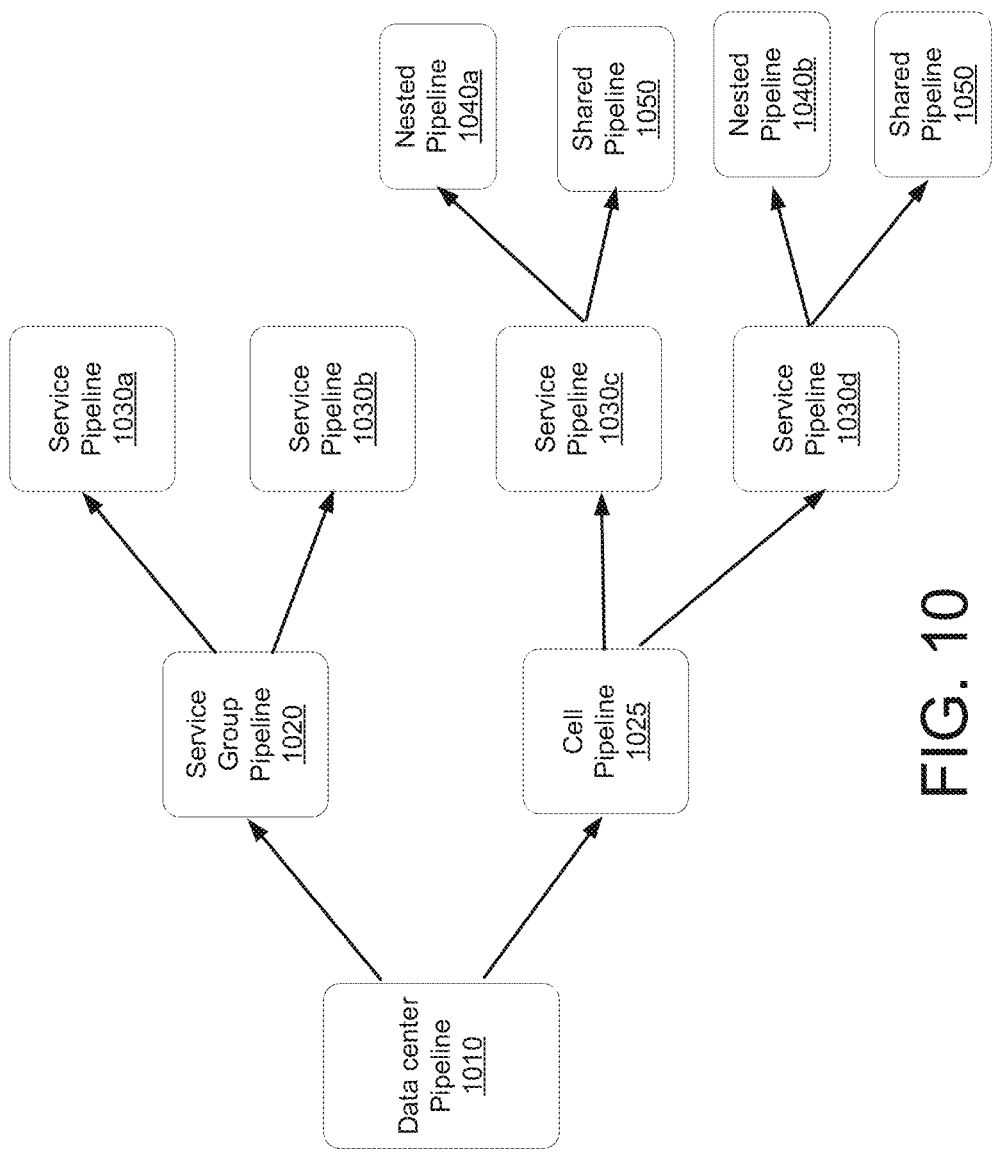
FIG. 10 shows an example master pipeline according to an embodiment.

FIG. 10 shows an example master pipeline according to an embodiment. The master pipeline is a hierarchical pipeline where each stage of a pipeline may comprise a pipeline with detailed instructions for executing the stage. The master pipeline hierarchy may mirror the datacenter hierarchy. For example, the top level of the master pipeline represents a sequence of stages for different environments. Each environment may include one or more pipelines for datacenter instances or pipelines for other types of datacenter entities. A datacenter instance pipeline 1010 may include service group pipelines 1020. Each service group pipeline 1020 may include one or more service pipelines 1030. A datacenter instance pipeline 1010 may include cell pipelines 1025, each cell pipeline 1025 comprising one or more service pipelines 1030. The service pipeline 1030 may comprise stages, each stage representing a pipeline representing instructions for deploying the service for specific environments.

A service pipeline includes detailed service specific instructions for performing an operation related to a service. For example, deployment for a service may include pre-deployment steps, deployment steps, post deployment steps, and post deployment test and validation step. A service pipeline may invoke other pipelines that are nested within the service pipelines. For example, as shown in FIG. 10, the service pipelines 1030c and 1030d invoke other pipelines. The pipelines invoked by a service pipeline 1030 may be a nested pipeline 140 that is designed specifically for that specific service pipeline 1030. For example, a team may design pipelines for a specific purpose associated with a specific service. The team may design nested pipelines 1040 that are invoked by the service pipeline 1030. For example, the service pipeline 1030c invokes a nested pipeline 1040a and the service pipeline 1030d invokes a nested pipeline 1040b. Some pipelines are shared pipelines 1050 that may be invoked by different service pipelines. For example, the shared pipeline 1050 is invoked by the service pipeline 1030c as well as service pipeline 1030d.

A master pipeline may be driven by pull requests that occur when a version control system for software receives a request for considering changes committed to an external repository for inclusion in a project's main repository. Accordingly, the master pipeline is automatically triggered when a pull request is received and deploys a software artifact based on the latest software version for which the pull request is received. The master pipeline performs continuous delivery of software artifacts based on pull requests. The master pipeline may be driven based on an on-demand manner, for example, by invoking a request using application programming interface (API) of the deployment module 210. The on-demand deployment based on master pipelines may be requested for any set of services and for any version for a given service as specified using the API. The master pipeline may be invoked to request a rollback from the current version to a previous version or a rollforward from the currently deployed version to a more recent version.

In an embodiment, the deployment module 210 creates a service master pipeline for each service. These pipelines get triggered when a pull request is received for a repository of the software. The deployment module 210 receives pipeline templates from users for specific services. These pipeline templates include detailed instructions for testing, validation, build, etc. for specific services. The datacenter generation module 220 receives a cloud platform independent declarative specification for one or more datacenters. The datacenter generation module 220 generates (or configures) datacenters according to the received cloud platform independent declarative specifications. The deployment module 210 receives promotion decision 815 pipelines. The promotion decision 815 pipelines are integrated into the overall master pipeline.

The pipeline generator creates all pipelines for each datacenter from the templates and combines them via master pipelines in a hierarchical fashion, for example, as illustrated in FIG. 10. In an embodiment, the pipeline generator generates service pipelines for individual services; the pipeline generator generates cell master pipelines to invoke the service pipelines; the pipeline generator generates service group master pipelines to invoke cell master pipelines; the pipeline generator generates datacenter instance master pipelines to invoke service group pipelines; the pipeline generator generates a service master pipeline to invoke the datacenter instance master pipelines.

Following is a snippet of a master pipeline showing various stages. Each stage may specify attributes including a stage name, a type of pipeline, a stage type (e.g., master deployment pipeline or promotion pipeline), prior stages, and so on.

```
{
  "stages": [
    {
      "stage_name": "Artifact version map for service SVC",
      "stage_type": "version_map",
      "prior_stage_ids": [ ]
    },
    {
      "pipeline_type": "env-type-aggregate",
      "template_name": "deploy_dev.j2",
      "stage_name": "Deploy to dev env",
      "stage_type": "master_deployment_pipeline",
      "prior_stage_ids": [ " Artifact version map for service SVC" ]
    },
    {
      "promote_to": "test",
      "template_name": "promote.j2",
      "pipeline_type": "promotion",
      "stage_name": "Promote to test env",
      "stage_type": "promotion",
      "prior_stage_ids": [ "Deploy to dev env" ]
    },
    {
      "pipeline_type": "env-type-aggregate",
      "template_name": "deploy_test.j2",
      "stage_name": "Deploy to test env",
      "stage_type": "master deployment pipeline",
      "prior stage ids": [ "Promote to test env" ]
    },
    {
      "promote_to": "stage",
      "template_name": "promote.j2",
      "pipeline_type": "promotion",
      "stage_name": "Promote to staging env",
      "stage_type": "promotion",
      "prior_stage_ids": [ "Deploy to test env" ]
    },
    {
      "promote_to": "stage",
      "template_name": "promote.j2",
      "pipeline_type": "promotion",
      "stage_name": "Promote to staging env",
      "stage_type": "promotion",
      "prior_stage_ids": [ "Deploy to test env" ]
    } ...
```

As shown in the examiner master pipeline, the first stage is an artifact version map processing stage. The next stage is a master deployment pipeline for deploying to development environment. The next stage is a promotion pipeline for determining whether the software artifact can be promoted to the next stage. The next stage is a master deployment pipeline for deploying to test environment. The next stage is a promotion pipeline for determining whether the software artifact can be promoted to the next stage that is staging environment.

Software Artifact Version Map

In an embodiment, the deployment module 210 receives an artifact version map that associates various software artifacts and their versions with datacenter entities. The artifact version map provides a declarative specification of the specific versions of software artifacts that need to be deployed for services in different datacenter entities. Each datacenter entity may be uniquely identified based on its location within the datacenter hierarchy as specified by the declarative specification of the datacenter. For example, for a service, a software library may act as a software artifact. The software artifact may have multiple versions, for example, V1, V2, V3, and so on. The artifact version map may specify that version V1 needs to be deployed in datacenter entities C1 and C2 and version V2 needs to be deployed in datacenter entities C3 and C4. The deployment module 210 generates master pipelines and instructions that ensure that the appropriate software artifact versions are deployed in the datacenter entities as specified in the artifact version map.

In an embodiment, the artifact version map is specified as a JSON (Javascript object notation) file, a YAML file, or a file using any other syntax for representing nested objects. The artifact version map may comprise a set of <service>:<version> key pairs that are associated with various datacenter entities distributed across a hierarchy of a datacenter. The artifact version map key pairs act as whitelists for corresponding pipelines. If a key for a service is not included into an artifact version map, all pipelines for that service are excluded during execution of the pipeline. Different artifact version maps may be applied to the same master pipeline resulting in different services being included/excluded during execution of the master pipeline.

Following is an example artifact version map. The artifact version map specifies environment types using the attribute "env_types". In the following example, the environment type development is specified. The environment type may include one or more datacenter instances; a datacenter instance may include one or more service groups, a service group may include one or more services. In the following example, the software artifact name is specified as library1 and version as version1 and is associated with the service instance instance001. However, the software artifact name and version may be associated with any level of datacenter entity in the hierarchy. For example, of the software artifact name and version is specified or a service group, the software artifact name and version is applicable to all services within the service group unless the software artifact name and version is overridden with different values of the software artifact name and version specified for a particular service instance within the service group. Similarly, the software artifact name and version can be specified for a datacenter instance and is applicable to all service groups or cells within the datacenter instance unless an overriding value is specified for a service group.

```
{
  "name": "artifact_version_map1"
  "schema_version": "0.1",
  "release_label": "release1.1",
  "deployments": {
    "env_types": [
      {
        "name": "development",
        "datacenter_instances": [
          {
            "name": "datacenter1",
            "service_group": [
              {
                "name": "service_group1",
                "services": [
                  {
                    "service_instance": "instance001",
                    "name": "service1",
                    "versions": [
                      {
                        "software_artifact_name": "library1"
                        "version": "version1"
                      }
                    ]
                  }
                ]
              }
            ]
          }
        ]
      }
    ],
  }
}
```

In an embodiment, the artifact version map specifies a datacenter entity using a full path of the datacenter entity, for example, "stagger_group1/datacenter1/service_group2/service1". In an embodiment, the artifact version map specifies a set of datacenter entities using regular expressions in the full path of the datacenter entity. For example, a full path that includes service_group[?] includes service_group1, service_group2, service_group3, and so on.

Following is an example of an artifact version map specifying regular expressions to define a set of services. The environment types are specified as dev and test and the datacenter entities in the full path including datacenter instances and service groups are specified as wildcards and service instances are specified as "service*". Accordingly, for all datacenter instances for dev and test environments, for all service groups, for services names matching service*, the version V1 of application app1 will be deployed.

```
env_types:
  - name: "dev | test"
    datacenter_instances:
      - name: "(.*)"
        service_group:
          - name: "(.*)"
            services:
              - service_instance: service*"
                name: "app1"
                versions:
                    version: "V1"
```

In some embodiments, the artifact version map may specify parameters used by pipelines. Accordingly, the specified parameters will be applicable to a stagger group for which the parameter is specified. The artifact version map and master pipelines can be used to orchestrate various types of operations related to continuous delivery of software artifacts in a cloud-based datacenter.

Shared Pipelines

In some embodiments a team may design a shared pipeline, for example, shared pipeline 1050 that is general purpose and is intended to be invoked by different service pipelines. A shared pipeline may also be referred to as a service independent pipeline since a shared pipeline is designed to be invoked by different service pipelines and is not designed for a specific service pipeline. As a result, the teams designing the shared pipeline lack the context in which the shared pipeline is likely to be invoked. Accordingly, a service pipeline 1030c may invoke a shared pipeline 1050 differently compared to a service pipeline 1030d that also invokes the shared pipeline 1050. For example, the service pipeline 1030c may pass a different set of parameters to the shared pipeline 1050 compared to the parameters passed by the service pipeline 1030d to the shared pipeline 1050. Similarly, the shared pipelines may use a software artifact S1 and the service pipeline 1030c may use version V1 of software artifact S1 for the shared pipeline 1050 whereas the service pipeline 1030c may use version V2 of software artifact S1 for the shared pipeline 1050. The system according to various embodiments provides a mechanism for different service pipelines to invoke the same shared pipeline differently.

In an embodiment, an auxiliary service is created for the shared pipeline. The auxiliary service is included in the data center hierarchy that is created by the declarative specification of the datacenter. The auxiliary service is added to the data center entities (for example, a datacenter, or a service group such as a functional domain) where the shared pipeline needs to be invoked. A stage is added to the shared pipeline that processes the artifact version map for the shared pipeline since the shared pipeline is not automatically created similar to the master pipelines. Since master pipelines are automatically created, the stage for processing the artifact version map may be automatically added to the master pipelines.

According to an embodiment, there are two types of shared pipelines: (1) datacenter specific pipelines and (2) data center independent pipeline. The data center dependent shared pipelines are dependent on datacenter entities defined in a declarative specification. For example, a data center dependent shared pipeline may be dependent on a particular data center or other data center entities such as service groups or cells. However, these shared pipelines are not dependent on other datacenter entities. In contrast, the data center independent pipeline are not dependent on any datacenter entities defined via a declarative specification. They are applicable to any datacenter or any datacenter entity. These may be defined globally for a pipeline execution engine 360, for example, SPINNAKER and can be used by any datacenter entity managed by the pipeline execution engine 360.

According to an embodiment, the system generates two types of artifact version maps: (a) a master pipeline artifact version map and (b) a baseline artifact version map. Both artifact version maps are used for different purposes as described below.

The master pipeline artifact version map is used for managing the flow of the master pipeline or aggregate pipelines. The master pipeline artifact version map is typically targeted for a particular service and may be designed by the team for that particular service. The master pipeline artifact version map defines the data center entities where the particular service needs to be deployed and the versions of various software artifacts of the service and the versions of the master pipeline corresponding to each data center entity. The master pipeline artifact version map is used when a new software artifact or a pipeline version is tested against or released to a set of data center entities defined using a declarative specification.

The baseline artifact version map is distinct from the master pipeline artifact version map and is used for shared pipelines. The baseline artifact version map does not specify any targets for a specific service. Instead, the baseline artifact version map is applicable for all services that invoke the shared pipeline. Accordingly, the baseline artifact version map may include unresolved targets in the specification, for example, targets specified as regular expressions that include wildcards. These targets may be materialized differently for different services that invoke the shared pipeline. The baseline artifact version map identifies the software artifacts of the shared pipeline, pipeline versions for the shared pipeline and parameters for the shared pipeline and any of its dependencies.

Invocation of Shared Pipelines

Figure 11:
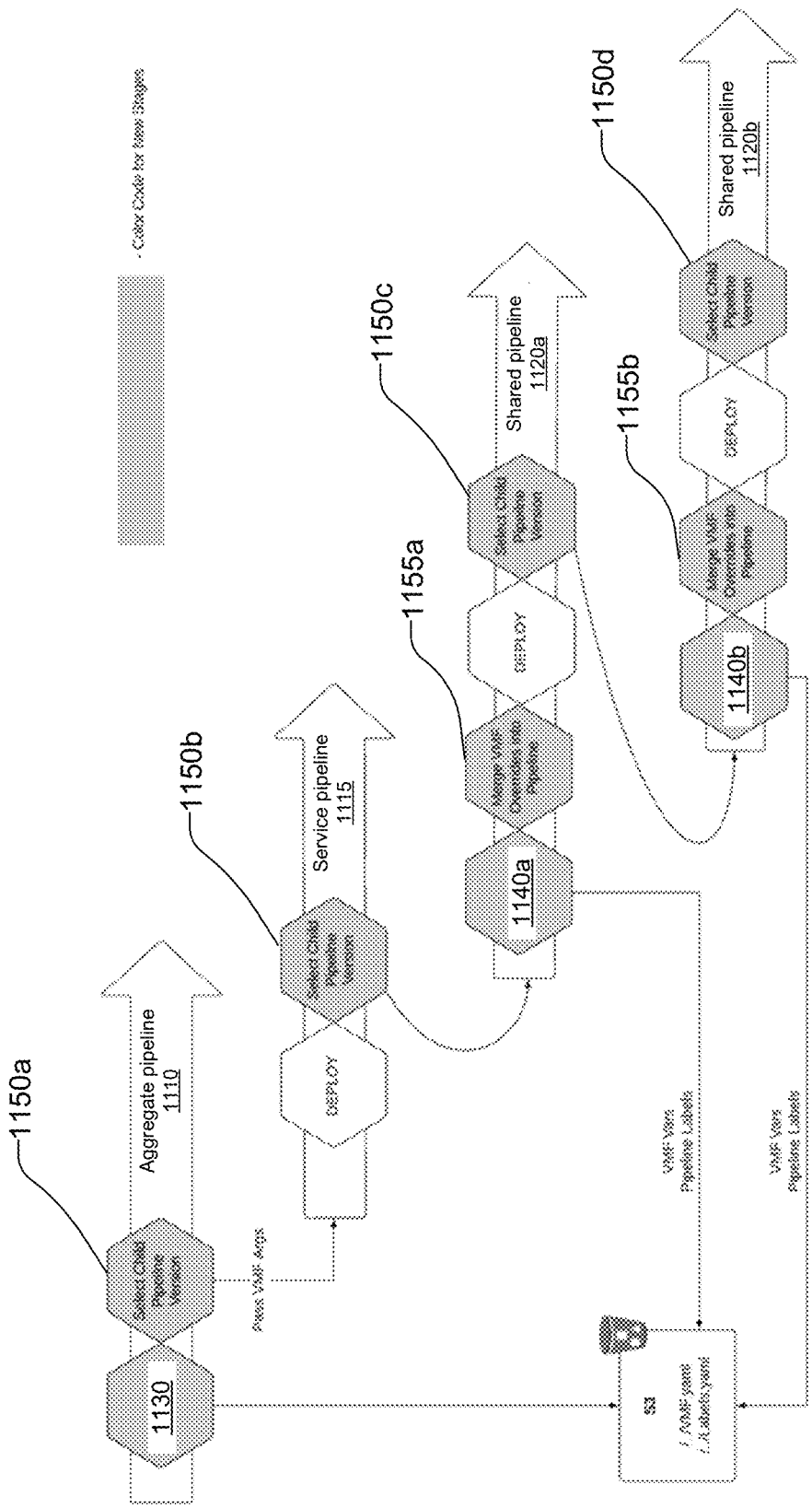
FIG. 11 illustrates invocation of a shared pipelines by other pipelines according to an embodiment.

FIG. 11 illustrates invocation of a shared pipelines by other pipelines according to an embodiment. A shared pipeline may be invoked by other pipelines including other service pipelines as well as other shared pipelines. FIG. 11 shows an aggregate pipeline 1110 that is generated by the system. The aggregate pipeline 1110 may be for a data center or for a service group, for example, a functional domain. The aggregate pipeline 1110 includes a stage 1130 that processes the master pipeline artifact version map to determine the versions of artifacts or pipelines associated with stages of the aggregate pipeline 1110 to the data center entities. The aggregate pipeline 1110 may invoke one or more service pipelines 1115. A pipeline 1110, 1115, 1120a, 1120b may include a stage 1150a, 1150b, 1150c, 1150d for selecting child pipeline version based on information obtained from the master pipeline artifact version map.

A service pipeline 1115 may invoke a shared pipeline 1120. Multiple service pipelines 1115 may invoke the same shared pipeline 1120. A shared pipeline 1120a may invoke another shared pipeline 1120b. A shared pipeline 1120a, 1120b includes a stage 1140a, 1140b that processes a baseline artifact version map corresponding to the shared pipeline. A shared pipeline 1120a, 1120b includes a stage 1155a, 1155b respectively, that merges the values overridden by the master pipeline artifact version map with versions specified in the baseline artifact version map of the shard pipeline to resolve any conflicts and determine the final mapping of the versions of artifacts and pipelines to the various data center entities.

Figure 12:
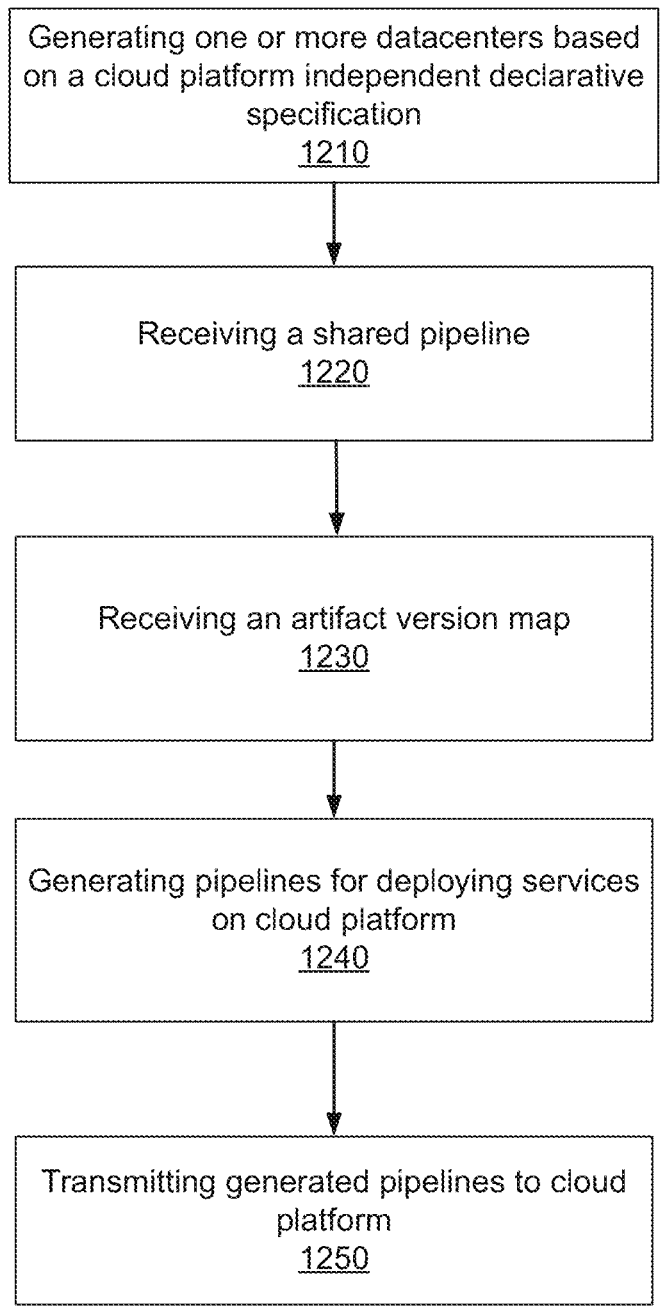
FIG. 12 shows a flowchart illustrating a process for invoking shared pipelines according to an embodiment.

FIG. 12 shows a flowchart illustrating a process for invoking shared pipelines according to an embodiment. Other embodiments may execute the steps in an order different from that indicated in FIG. 12.

The system generates 1210 one or more datacenters based on a cloud platform independent declarative specification. The datacenters are generated based on various processes described herein.

The system receives 1220 a specification of a shared pipeline. The specification of the shared pipeline specifies one or more values, for example, values representing version of artifacts deployed by the shard pipeline or versions of other pipelines invoked by the shared pipeline.

The system receives 1230 an artifact version map associating data center entities with services targeted for deployment on the datacenter entities. The artifact version map specifies values associated with different invocations of the shared pipelines. The values are specified for overriding default values of the shared pipeline. For example, the artifact version may specify values for an invocation I1 of the shared pipeline for service S1 targeted for deployment on a datacenter entity D1 and an invocation I2 of the shared pipeline for a service S2 targeted for deployment on a datacenter entity D2. The values may represent versions of the shared pipeline for each invocation, versions of software artifacts deployed by the shared pipeline\, or values of parameters used by the shared pipelines.

The system generates 1240, based on the artifact version map, one or more deployment pipelines configured to build and deploy services on the cloud platform. The deployment pipelines include (1) a parent pipeline P1 corresponding to the first invocation I1 of the shared pipeline and (2) a parent pipeline P2 corresponding to the second invocation I2 of the shared pipeline. The parent pipeline P1 is targeted for deployment of the service S1 on the datacenter entity D1 and (2) a parent pipeline P2 is targeted for deployment of the service S2 on the datacenter entity D2.

The system transmits 1250 the one or more deployment pipelines to the cloud platform for execution. The deployment pipelines invoke the shared pipelines according to the artifact version map.

The system according to various embodiments supports the following capabilities related to shared pipelines using the baseline artifact version map: (1) pipeline versioning for shared pipelines (2) parameter overrides via baseline artifact version map (3) artifact version overrides using baseline artifact version map (4) staggered roll out of pipeline versions to datacenter entities and (5) promotion of pipeline or artifact versions in staggered manner. Details of each of these capabilities are described in detail herein.

The values of a shared pipeline may be overridden using either the baseline artifact version map or the master pipeline artifact version map. The values that may be overridden include versions of artifacts, versions of the pipeline, promotion criteria used for promoting artifacts in the shared pipeline, and so on. The values specified in the baseline version artifact may be overridden by the values specified in the master pipeline artifact version map. Accordingly, the system uses a value specified in the shared pipeline configuration if the values are not overridden by the baseline version artifact map or the master pipeline artifact version map. If a value is specified in the baseline version artifact map, that value is used unless the corresponding value is overridden using the master pipeline artifact version map. If a value is specified in the master pipeline artifact version map, the value overrides both the values specified by the baseline artifact version map and the shared pipeline configuration.

The system supports pipeline versioning for shared pipelines. The artifact version map allows service owners of a service to specify which version of the shared pipeline is invoked from a parent pipeline of the service. Accordingly, the artifact version map may specify that a service S1 associated with a parent pipeline P1 invokes a version V1 of the shared pipeline whereas a service S2 associated with a parent pipeline P2 invokes a version V2 of the shared pipeline. Accordingly, during deployment, the parent pipeline P1 invokes version V1 of the shared pipeline and parent pipeline P2 invokes version V2 of shared pipeline.

The system supports parameter overrides via an artifact version map. For example, the shared pipeline may use one or more parameters that can be overridden by a parent pipeline that invokes the shared pipeline. Accordingly, the parent pipeline P1 may specify a value param1 for the parameter of the shared pipeline whereas parent pipeline P2 may specify a value param2 for the parameter of the shared pipeline. During deployment, the shared pipeline is invoked with different override parameters specified by different parent pipelines. The values of parameters that are used by different parent pipelines associated with the services may be specified in the artifact version map.

The system supports override of artifact versions of the shard pipeline using an artifact version map. The shared pipeline may use a set of artifacts. Each artifact used by the shared pipeline may be associated with one or more versions. Accordingly, a service S1 configured to be deployed on a datacenter entity D1 may specify that version Vx of the artifact should be used for service S1 whereas a service S2 configured to be deployed on a datacenter entity D2 may specify that version Vy of the artifact should be used for service S2. During deployment, the shared pipeline is invoked with different artifact versions for different services as specified in the artifact version map.

The system supports staggered roll out of pipeline versions to datacenter entities. The artifact version map may be used to specify different pipeline versions to be deployed in different data center entities. Furthermore, the system supports promotion of pipeline or artifact versions in staggered manner. Accordingly, the artifact version map may be used to specify different promotion criteria to be used within the shared pipeline for different parent pipelines.

The values specified by the shared pipeline are used if they are not overridden by a parent pipeline using an artifact version map. For example, a version of an artifact specified by the shared pipeline is used by default unless the value of the version is overridden by a parent pipeline according to the artifact version map. The latest version of the shared pipeline may be used by default unless the version of the pipeline is specified by a parent pipeline according to the artifact version map. The shared pipeline may specify default values of parameters. The default value of a parameter is used during an invocation unless the value of the parameter is overridden by a parent pipeline using the artifact version map.

Process Illustrating Shared Pipeline Workflow

Figure 13:
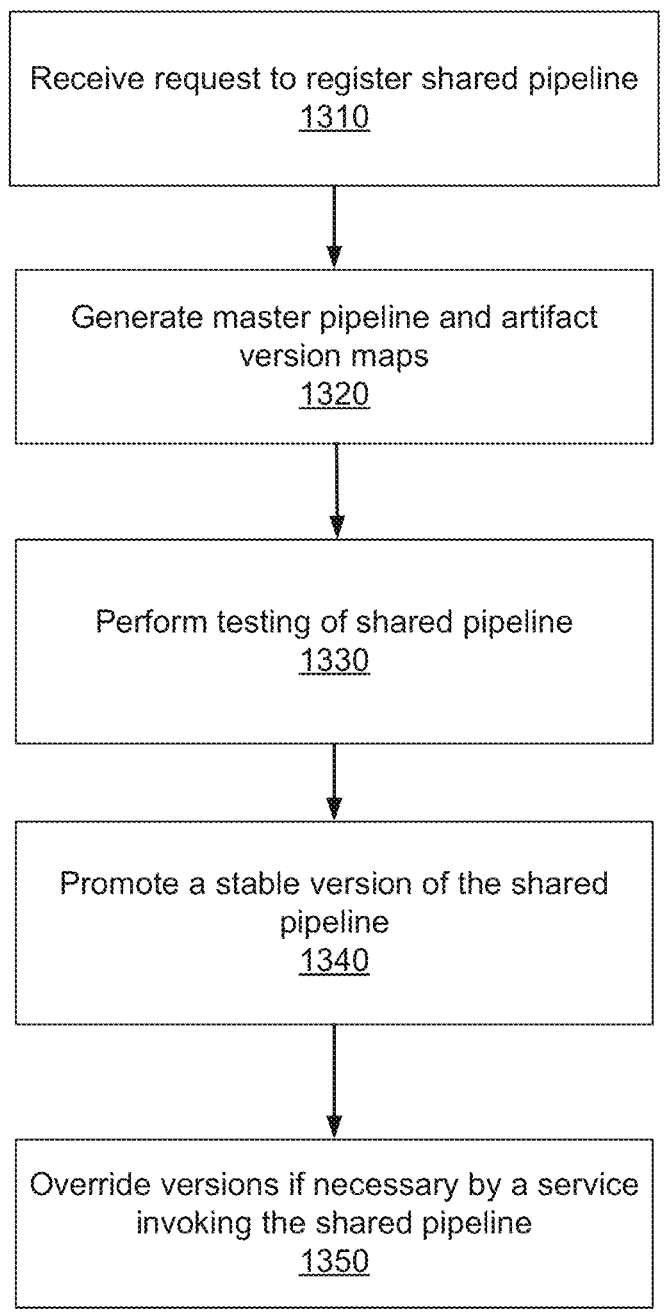
FIG. 13 shows a flowchart illustrating a workflow for shared pipelines according to an embodiment.

FIG. 13 shows a flowchart illustrating a workflow for shared pipelines according to an embodiment. Other embodiments may execute the steps in an order different from that indicated in FIG. 13.

The system receives 1310 a request to register a shared pipeline. Accordingly, services owners of shared pipelines define a service associated with the shared pipeline and register the service with the system. The registration specifies a location for the service within the hierarchy of the datacenter. The registration also species testing targets for the shared pipeline including datacenters, service groups such as functional domains, cells, clusters and so on to be used for testing of the shared pipeline.

The system generates 1320 a master pipeline based on the datacenter hierarchy. The master pipeline is configured to perform orchestration across all the testing targets and orchestration across the various environments for the shared pipeline. The system also generates one or more artifact version maps. An artifact version map may specify the targets for the testing infrastructure for the shared pipeline that may be performed by the service owners of the shared pipeline. Another artifact version may specify targets for testing of the shared pipeline by a customer, for example, services that invoke the shared pipeline.

The system further receives request to perform testing of the shared pipeline and performs 1330 the testing of the shared pipelines in accordance with the generated master pipelines and the artifact version maps. The testing is performed using the testing targets identified for the service owners for testing the shared pipeline. Testing is further performed for testing targets identified for a customer scenario where the shared pipeline is invoked by a parent pipeline associated with a service.

The system promotes 1340 a stable version of the shared pipeline and a stable version of the software artifacts used by the shared pipeline. The stable version is generated for use by customers. The shared pipelines are executed using the stable version. By default, parent pipeline for a service that invokes the shared pipeline uses the stable version of the shared pipeline and the software artifacts.

A service invoking the shared pipeline may override 1350 either the version of the shared pipeline or versions of software artifacts of the shared pipeline if necessary. The service may override the versions my specifying overriding values in the master pipeline artifact version map. Each stage includes a stage for parsing and processing an artifact version map that specifies the override values for the versions of the software artifacts or the shared pipelines.

Computer Architecture

Figure 14:
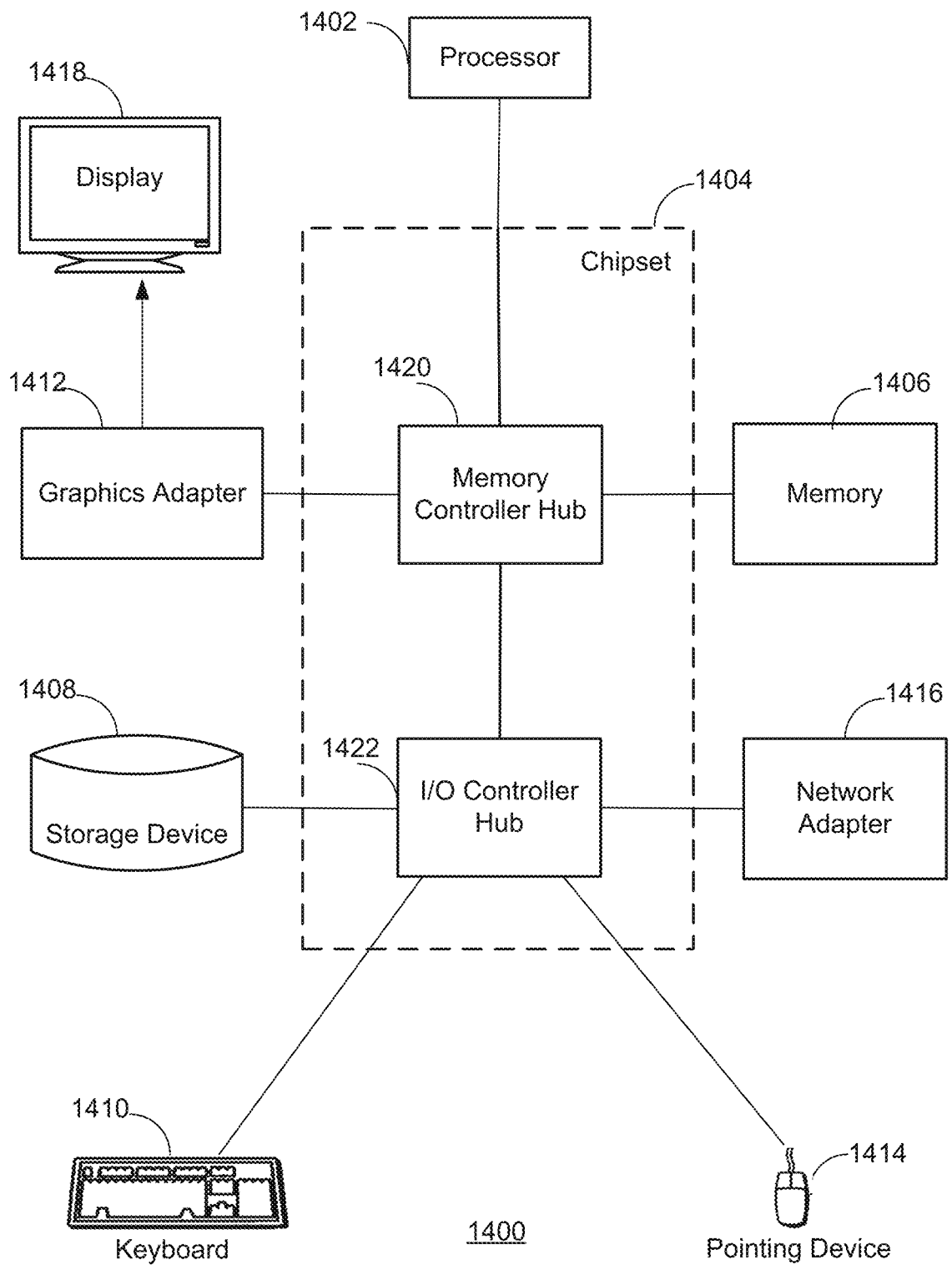
FIG. 14 is a block diagram illustrating a functional view of a typical computer system for use in the environment of FIG. 1 according to one embodiment.

FIG. 14 is a high-level block diagram illustrating a functional view of a typical computer system for use as one of the entities illustrated in the environment 100 of FIG. 1 according to an embodiment. Illustrated are at least one processor 1402 coupled to a chipset 1404. Also coupled to the chipset 1404 are a memory 1406, a storage device 1408, a keyboard 1410, a graphics adapter 1412, a pointing device 1414, and a network adapter 1416. A display 1418 is coupled to the graphics adapter 1412. In one embodiment, the functionality of the chipset 1404 is provided by a memory controller hub 1420 and an I/O controller hub 1422. In another embodiment, the memory 1406 is coupled directly to the processor 1402 instead of the chipset 1404.

The storage device 1408 is a non-transitory computer-readable storage medium, such as a hard drive, compact disk read-only memory (CD-ROM), DVD, or a solid-state memory device. The memory 1406 holds instructions and data used by the processor 1402. The pointing device 1414 may be a mouse, track ball, or other type of pointing device, and is used in combination with the keyboard 1410 to input data into the computer system 200. The graphics adapter 1412 displays images and other information on the display 1418. The network adapter 1416 couples the computer system 1400 to a network.

As is known in the art, a computer 1400 can have different and/or other components than those shown in FIG. 14. In addition, the computer 1400 can lack certain illustrated components. For example, a computer system 1400 acting as a multi-tenant system 110 may lack a keyboard 1410 and a pointing device 1414. Moreover, the storage device 1408 can be local and/or remote from the computer 1400 (such as embodied within a storage area network (SAN)).

The computer 1400 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1408, loaded into the memory 1406, and executed by the processor 1402.

The types of computer systems 1400 used by the entities of a system environment can vary depending upon the embodiment and the processing power used by the entity. For example, a client device may be a mobile phone with limited processing power, a small display 1418, and may lack a pointing device 1414. A multi-tenant system or a cloud platform, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer-implemented method for invoking shared pipelines on a cloud platform, the method comprising:
   accessing a datacenter configured on the cloud platform, the datacenter comprising a hierarchy of datacenter entities;
   receiving a shared pipeline specifying a value associated with a promotion criteria for promoting a software artifact from a first environment to a second environment, the shared pipeline configured to be invoked by other pipelines;
   receiving an artifact version map associating datacenter entities with software artifacts targeted for deployment on the datacenter entities, the artifact version map specifying (1) a first invocation of the shared pipeline for a first software artifact targeted for deployment on a first datacenter entity and (2) a second invocation of the shared pipeline for a second software artifact targeted for deployment on a second datacenter entity;
   generating, based on the artifact version map, one or more deployment pipelines including (1) a first parent pipeline causing the shared pipeline to implement a first promotion criteria, the first parent pipeline targeted for deployment of the first software artifact on the first datacenter entity and (2) a second parent pipeline causing the shared pipeline to implement a second promotion criteria, the second parent pipeline targeted for deployment of the second software artifact on the second datacenter entity; and
   transmitting the one or more deployment pipelines to the cloud platform for execution.

2. The computer-implemented method of claim 1, wherein the shared pipeline deploys a set of software artifacts, wherein the artifact version map specifies (1) a first set of versions of the set of software artifacts of the shared pipeline for a first datacenter entity and (2) a second set of versions of the set of software artifacts of the shared pipeline for a second datacenter entity, wherein the first parent pipeline is configured to build and deploy (1) the first set of versions of the set of software artifacts for the first invocation of the shared pipeline on the first datacenter entity and (2) the second set of versions of the set of software artifacts for the second invocation of the shared pipeline on the second datacenter entity.

3. The computer-implemented method of claim 1, wherein the artifact version map specifies a first version of the shared pipeline and a second version of the shared pipeline, wherein the first parent pipeline invokes the first version of the shared pipeline and the second parent pipeline invokes the second version of the shared pipeline.

4. The computer-implemented method of claim 1, wherein the shared pipeline specifies a parameter, wherein the first parent pipeline specifies a first override value of the parameter of the shared pipeline and the second parent pipeline specifies a second override value of the parameter of the shared pipeline.

5. The computer-implemented method of claim 1, wherein the datacenter generated based on a cloud platform independent declarative specification comprises a hierarchy of data center entities, wherein each datacenter entity comprises one or more of (1) a service or (2) one or more other data center entities.

6. The computer-implemented method of claim 1, wherein a deployment pipeline comprises a sequence of stages, each stage performing one or more actions for deploying a software artifact on a datacenter entity.

7. The computer-implemented method of claim 1, wherein the shared pipeline comprises one or more stages for processing the artifact version map and resolving values based on the artifact version map.

8. A non-transitory computer readable storage medium for storing instructions that when executed by a computer processor cause the computer processor to perform steps for invoking shared pipelines on a cloud platform, the steps comprising:
   accessing a datacenter configured on the cloud platform, the datacenter comprising a hierarchy of datacenter entities;
   receiving a shared pipeline, specifying a value associated with a promotion criteria for promoting a software artifact from a first environment to a second environment, the shared pipeline configured to be invoked by other pipelines;
   receiving an artifact version map associating datacenter entities with software artifacts targeted for deployment on the datacenter entities, the artifact version map specifying (1) a first invocation of the shared pipeline for a first software artifact targeted for deployment on a first datacenter entity and (2) a second invocation of the shared pipeline for a second software artifact targeted for deployment on a second datacenter entity;
   generating, based on the artifact version map, one or more deployment pipelines including (1) a first parent pipeline causing the shared pipeline to implement a first promotion criteria, the first parent pipeline targeted for deployment of the first software artifact on the first datacenter entity, the first parent pipeline causing the shared pipeline to implement a first promotion criteria and (2) a second parent pipeline causing the shared pipeline to implement a second promotion criteria, the second parent pipeline targeted for deployment of the second software artifact on the second datacenter entity; and
   transmitting the one or more deployment pipelines to the cloud platform for execution.

9. The non-transitory computer readable storage medium of claim 8, wherein the shared pipeline deploys a set of software artifacts, wherein the artifact version map specifies (1) a first set of versions of the set of software artifacts of the shared pipeline for a first datacenter entity and (2) a second set of versions of the set of software artifacts of the shared pipeline for a second datacenter entity, wherein the first parent pipeline is configured to build and deploy (1) the first set of versions of the set of software artifacts for the first invocation of the shared pipeline on the first datacenter entity and (2) the second set of versions of the set of software artifacts for the second invocation of the shared pipeline on the second datacenter entity.

10. The non-transitory computer readable storage medium of claim 8, wherein the artifact version map specifies a first version of the shared pipeline and a second version of the shared pipeline, wherein the first parent pipeline invokes the first version of the shared pipeline and the second parent pipeline invokes the second version of the shared pipeline.

11. The non-transitory computer readable storage medium of claim 8, wherein the shared pipeline specifies a parameter, wherein the first parent pipeline specifies a first override value of the parameter of the shared pipeline and the second parent pipeline specifies a second override value of the parameter of the shared pipeline.

12. The non-transitory computer readable storage medium of claim 8, wherein the datacenter generated based on a cloud platform independent declarative specification comprises a hierarchy of data center entities, wherein each datacenter entity comprises one or more of (1) a service or (2) one or more other data center entities.

13. The non-transitory computer readable storage medium of claim 8, wherein a deployment pipeline comprises a sequence of stages, each stage performing one or more actions for deploying a software artifact on a datacenter entity.

14. The non-transitory computer readable storage medium of claim 8, wherein the shared pipeline comprises one or more stages for processing the artifact version map and resolving values based on the artifact version map.

15. A computer system comprising:
a computer processor; and
a non-transitory computer readable storage medium for storing instructions that when executed by a computer processor cause the computer processor to perform steps for invoking shared pipelines on a cloud platform, the steps comprising:
    accessing a datacenter configured on the cloud platform, the datacenter comprising a hierarchy of datacenter entities;
    receiving a shared pipeline specifying a value associated with a promotion criteria for promoting a software artifact from a first environment to a second environment, the shared pipeline configured to be invoked by other pipelines;
    receiving an artifact version map associating datacenter entities with software artifacts targeted for deployment on the datacenter entities, the artifact version map specifying (1) a first invocation of the shared pipeline for a first software artifacts targeted for deployment on a first datacenter entity and (2) a second invocation of the shared pipeline for a second software artifacts targeted for deployment on a second datacenter entity;
    generating, based on the artifact version map, one or more deployment pipelines including (1) a first parent pipeline causing the shared pipeline to implement a first promotion criteria, the first parent pipeline targeted for deployment of the first software artifacts on the first datacenter entity, the first parent pipeline causing the shared pipeline to implement a first promotion criteria and (2) a second parent pipeline causing the shared pipeline to implement a second promotion criteria, the second parent pipeline targeted for deployment of the second software artifacts on the second datacenter entity; and
    transmitting the one or more deployment pipelines to the cloud platform for execution.

16. The computer system of claim 15, wherein the shared pipeline deploys a set of software artifacts, wherein the artifact version map specifies (1) a first set of versions of the set of software artifacts of the shared pipeline for a first datacenter entity and (2) a second set of versions of the set of software artifacts of the shared pipeline for a second datacenter entity, wherein the first parent pipeline is configured to build and deploy (1) the first set of versions of the set of software artifacts for the first invocation of the shared pipeline on the first datacenter entity and (2) the second set of versions of the set of software artifacts for the second invocation of the shared pipeline on the second datacenter entity.

17. The computer system of claim 15, the artifact version map specifies a first version of the shared pipeline and a second version of the shared pipeline, wherein the first parent pipeline invokes the first version of the shared pipeline and the second parent pipeline invokes the second version of the shared pipeline.

18. The computer system of claim 15, wherein the shared pipeline specifies a parameter, wherein the first parent pipeline specifies a first override value of the parameter of the shared pipeline and the second parent pipeline specifies a second override value of the parameter of the shared pipeline.

19. The computer system of claim 15, wherein the datacenter generated based on a cloud platform independent declarative specification comprises a hierarchy of data center entities, wherein each datacenter entity comprises one or more of (1) a service or (2) one or more other data center entities.

20. The computer system of claim 15, wherein a deployment pipeline comprises a sequence of stages, each stage performing one or more actions for deploying a software artifact on a datacenter entity.

* * * * *